United States Patent
Nonaka

(10) Patent No.: US 7,391,463 B2
(45) Date of Patent: Jun. 24, 2008

(54) IMAGE SENSING APPARATUS HAVING DISTANCE MEASURING UNIT AND CONTROL METHOD THEREOF

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 998 days.

(21) Appl. No.: 10/634,046

(22) Filed: Aug. 4, 2003

(65) Prior Publication Data

US 2004/0037546 A1    Feb. 26, 2004

(30) Foreign Application Priority Data

| | | |
|---|---|---|
| Aug. 6, 2002 | (JP) | 2002-228266 |
| Aug. 27, 2002 | (JP) | 2002-247358 |
| Sep. 27, 2002 | (JP) | 2002-283565 |

(51) Int. Cl.
*H04N 5/232* (2006.01)
*G03B 13/00* (2006.01)

(52) U.S. Cl. ............................ 348/350; 396/93

(58) Field of Classification Search ................ 348/345, 348/348–351, 353, 354, 356; 396/93, 104, 396/121–123
See application file for complete search history.

(56) References Cited

U.S. PATENT DOCUMENTS 6,954,233 B1 * 10/2005 Ito ............................ 348/350
7,071,985 B1 * 7/2006 Onoda et al. ............... 348/349
2004/0028401 A1 * 2/2004 Nonaka ...................... 396/121

FOREIGN PATENT DOCUMENTS

| JP | 2000292684 A | * 10/2000 |
|---|---|---|
| JP | 2000-321482 | 11/2000 |

* cited by examiner

*Primary Examiner*—Lin Ye
*Assistant Examiner*—Timothy J Henn
(74) *Attorney, Agent, or Firm*—Straub and Pokotylo; John C. Pokotylo

(57) ABSTRACT

An image sensing apparatus includes an image sensing element to form an object image which enters via a photographing optical system, a distance measuring unit to measure distances to at least first and second points within a photographing frame using an optical path different from the optical system. A determination unit determines a relationship between a distance measuring result and a drive amount of the optical system, on the basis of the distance measuring result upon measuring a distance to the first point by the distance measuring unit and a change in contrast of the object image formed at a position corresponding to the first point on the image sensing element when a focal point position of the optical system has changed. A control unit controls the focal point position of the optical system, on the basis of a distance measuring result at the second point and the relationship.

5 Claims, 20 Drawing Sheets

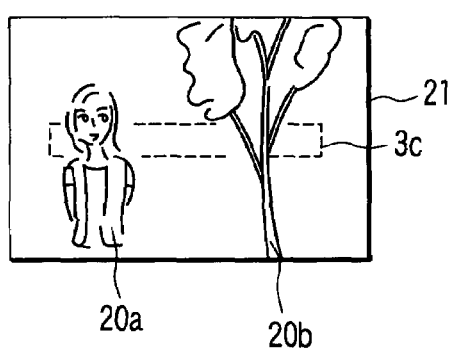
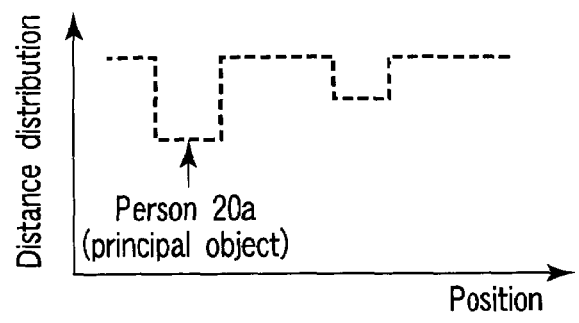
FIG. 3A  FIG. 3B
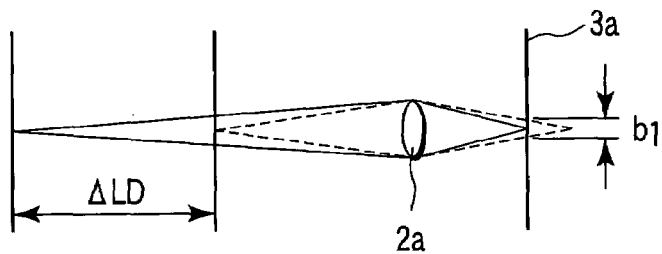
FIG. 4A
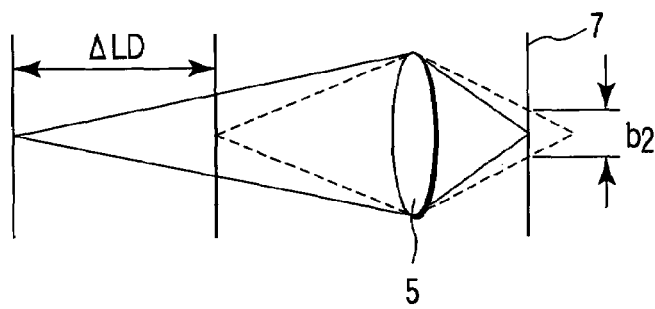
FIG. 4B

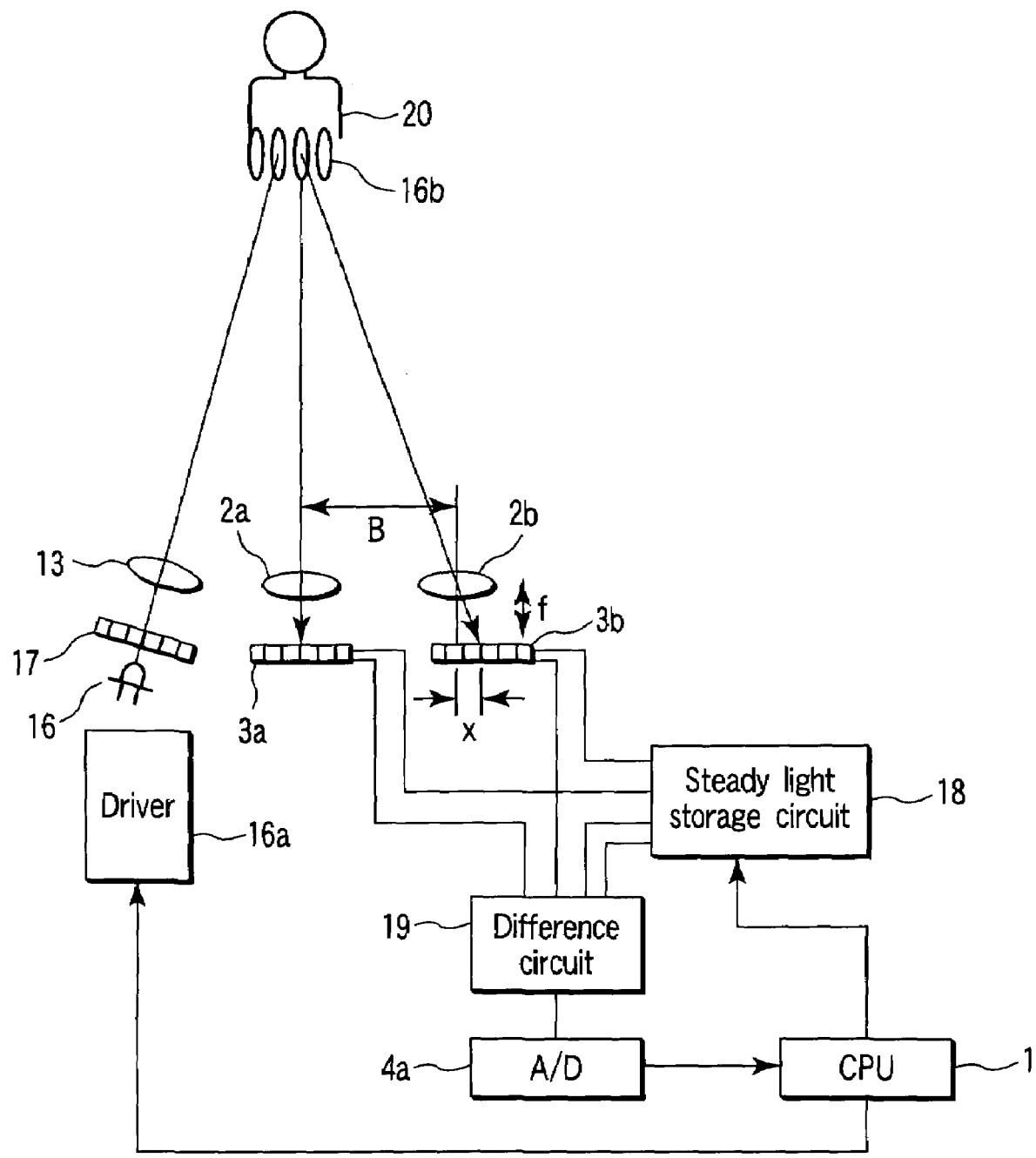
F I G. 11

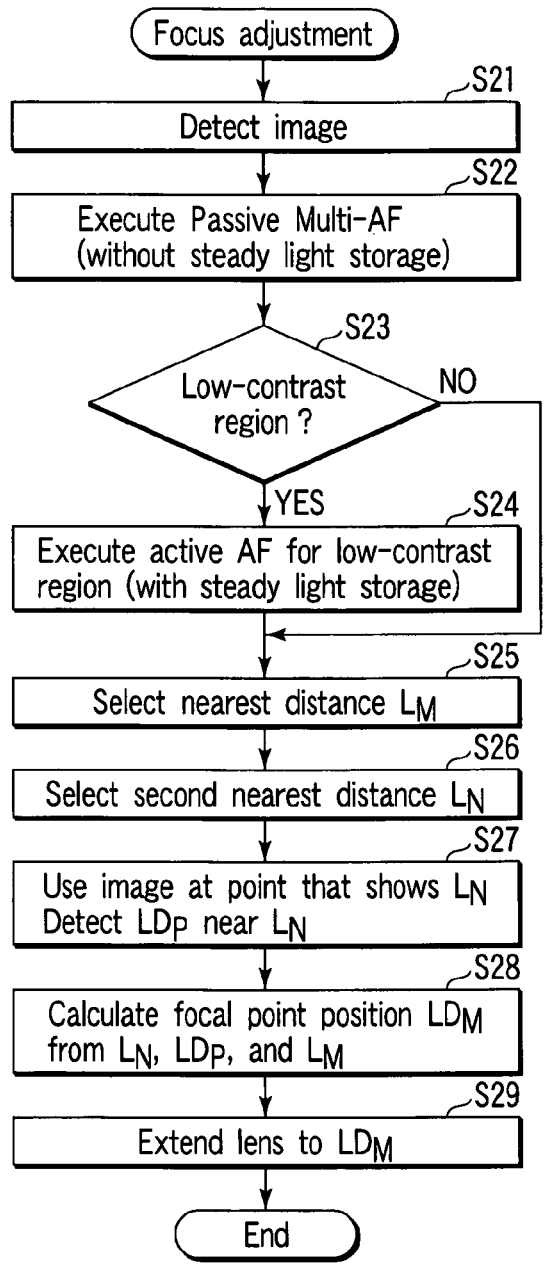
F I G. 12
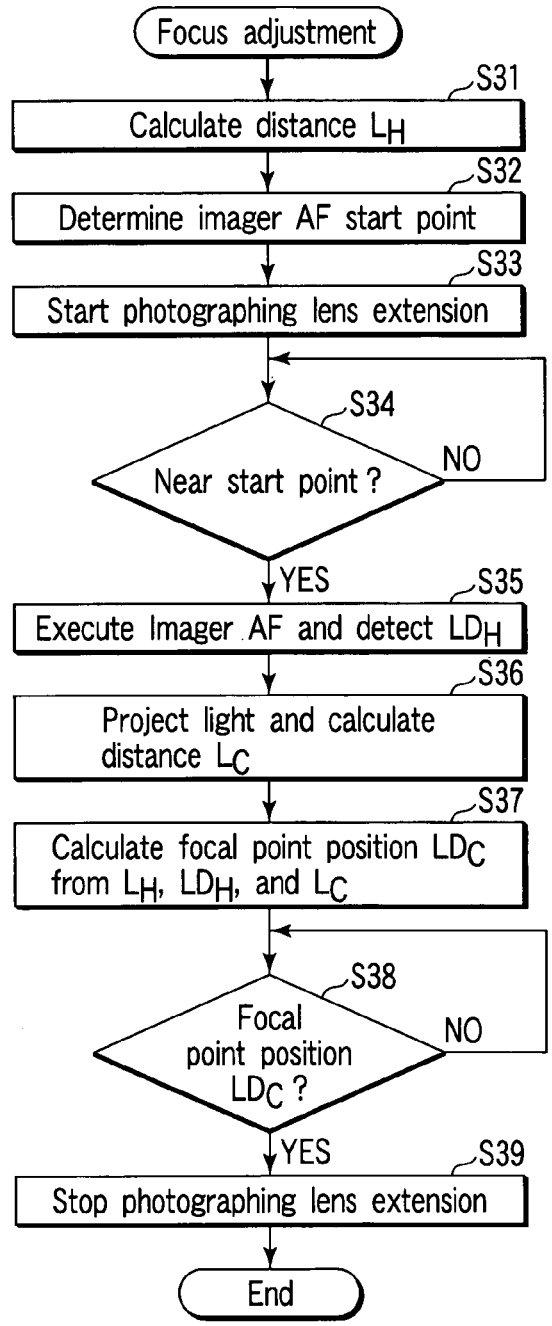
F I G. 15

Before light projection

After light projection

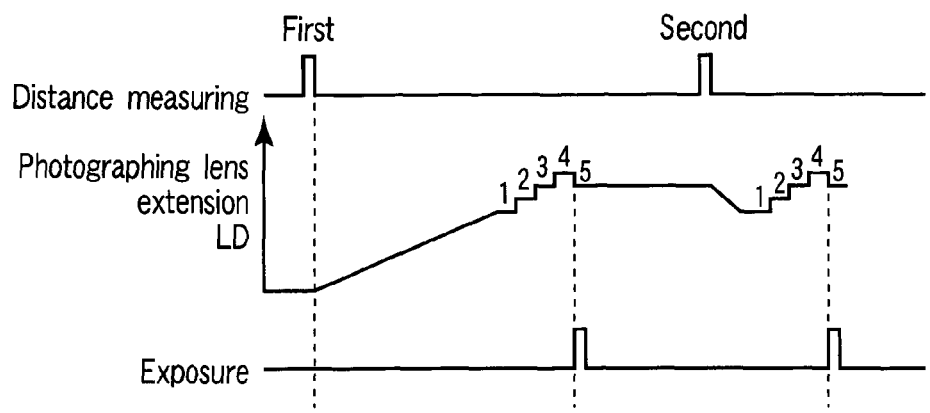
F I G. 21A
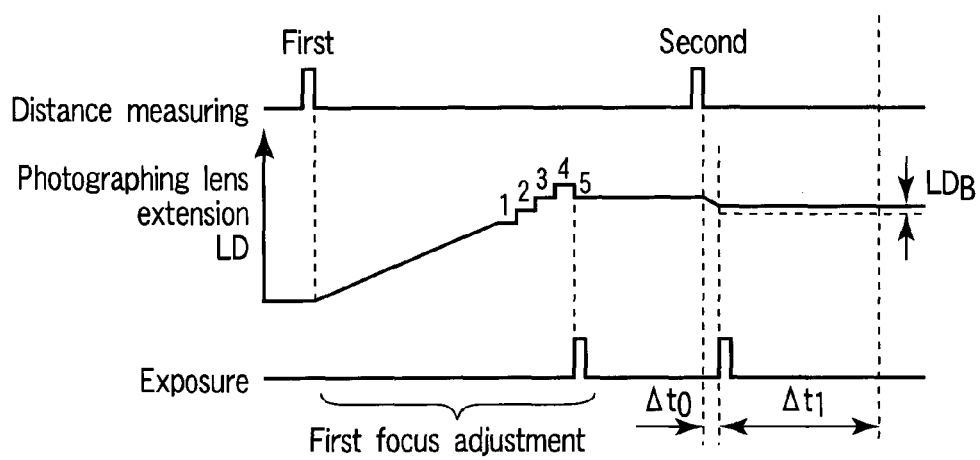
F I G. 21B
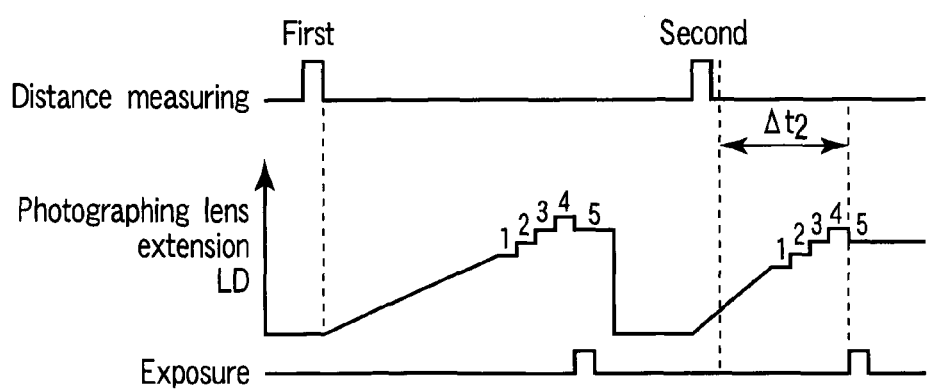
F I G. 21C

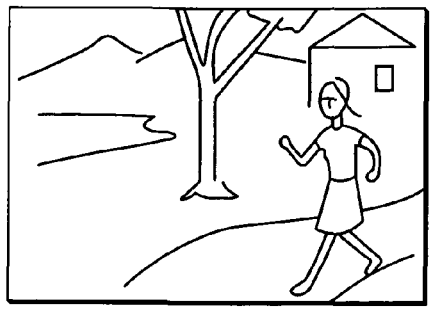 
FIG. 24A    FIG. 24B
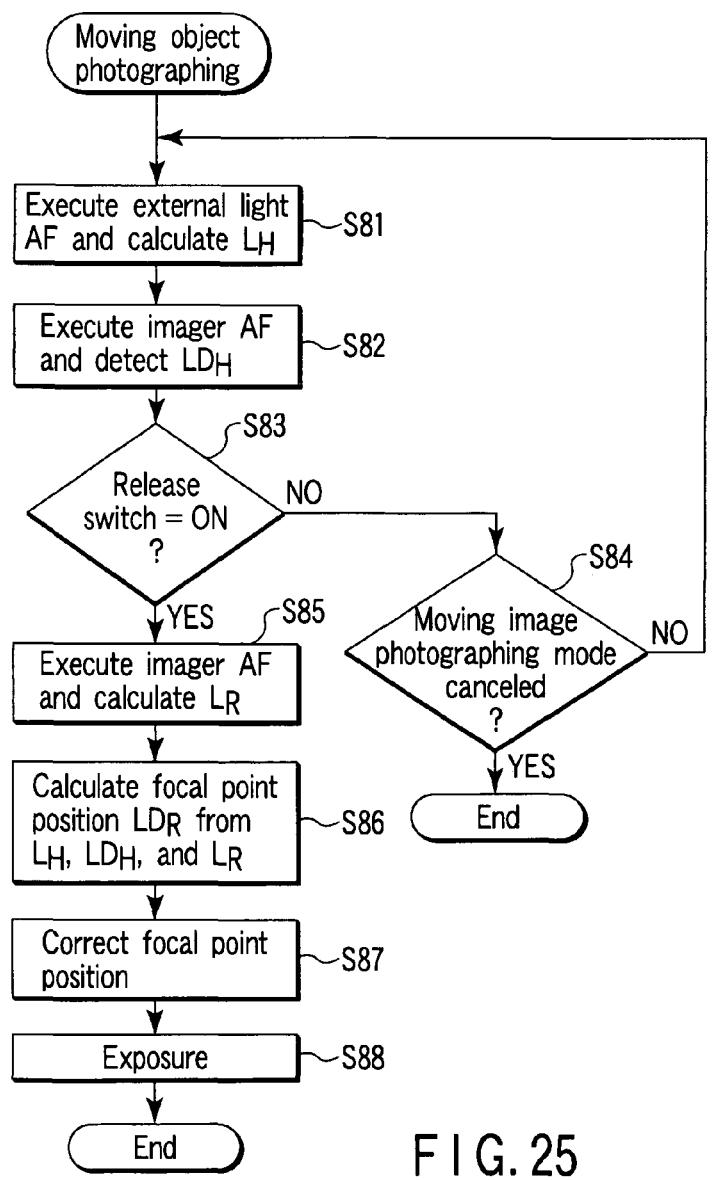
FIG. 25

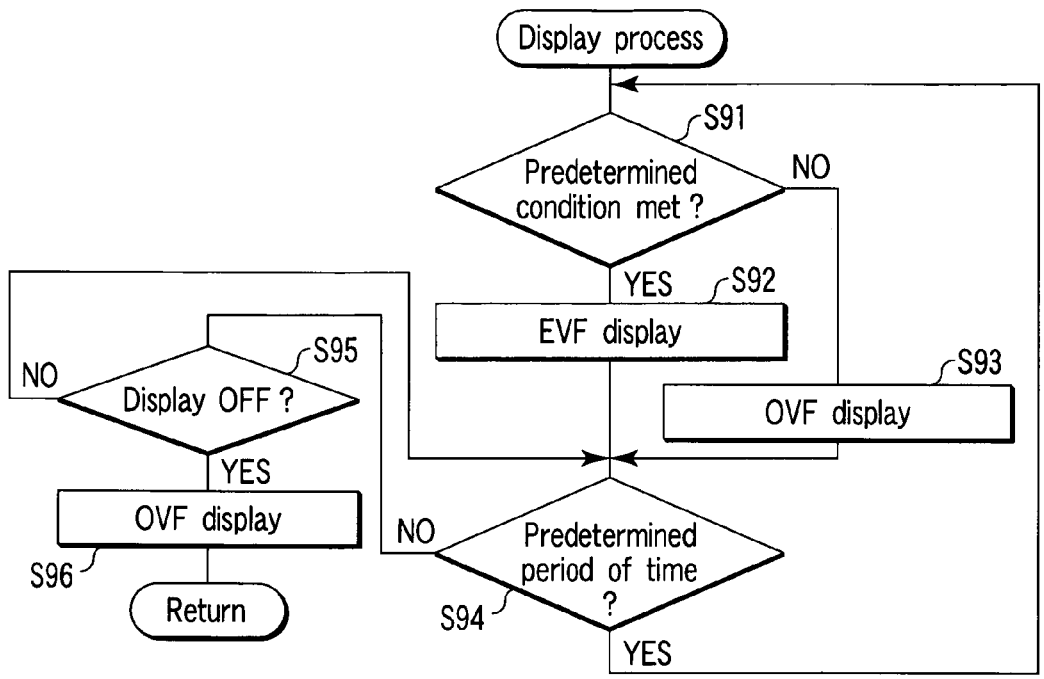
F I G. 30
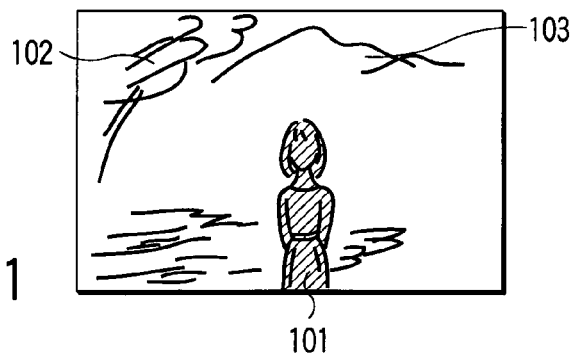
F I G. 31
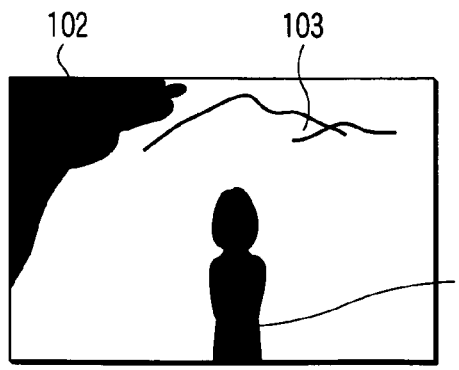
F I G. 32A
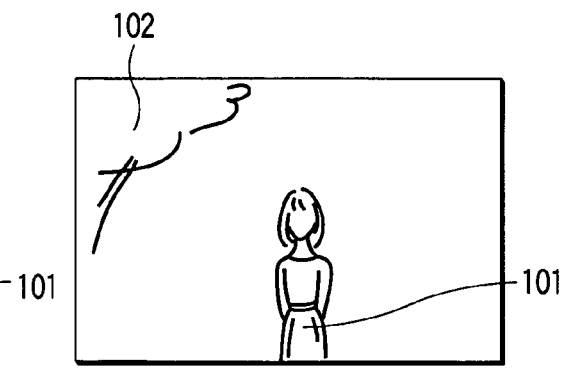
F I G. 32B

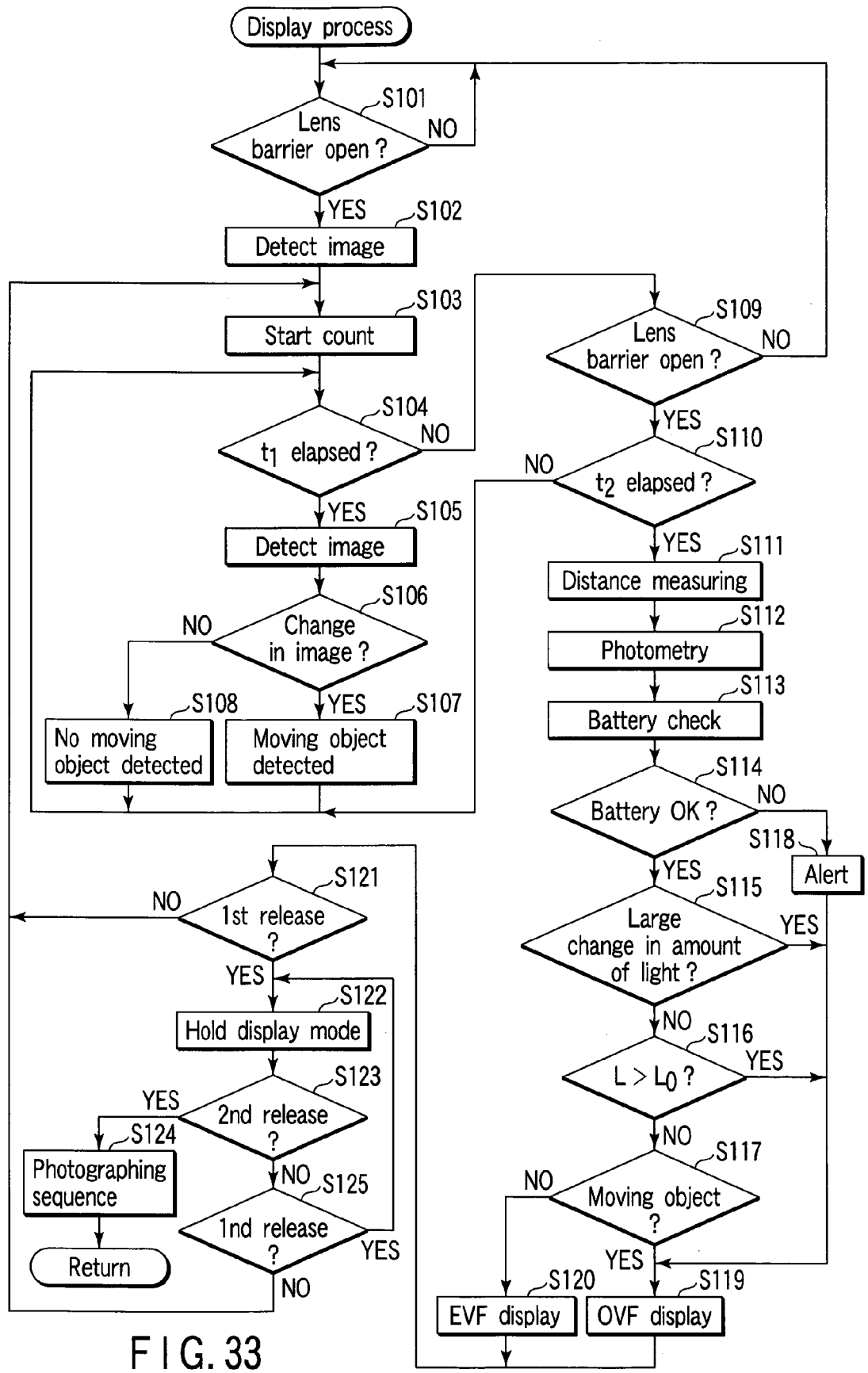
F I G. 33

IMAGE SENSING APPARATUS HAVING DISTANCE MEASURING UNIT AND CONTROL METHOD THEREOF

CROSS-REFERENCE TO RELATED APPLICATIONS

This application is based upon and claims the benefit of priority from the prior Japanese Patent Applications No. 2002-228266, filed Aug. 6, 2002; No. 2002-247358, filed Aug. 27, 2002; and No. 2002-283565, filed Sep. 27, 2002, the entire contents of all of which are incorporated herein by reference.

BACKGROUND OF THE INVENTION

1. Field of the Invention

The present invention relates to an image sensing apparatus having a distance measuring unit, and a control method thereof.

2. Description of the Related Art

A digital camera has an image sensing element such as a charge coupled device (CCD) for photographing. As an auto focus (AF) scheme using such image sensing element, an AF scheme that makes focus adjustment of a photographing lens by effectively using an image signal output from the image sensing element upon infinitesimally displacing the photographing lens of the digital camera is known. Such an AF scheme will be referred to as an imager AF scheme hereinafter. The imager AF scheme determines the focal point position of the photographing lens by detecting the contrast of an image signal output from the image sensing element.

On the other hand, a silver halide camera (especially, a compact camera) does not use such an image sensing element upon photographing. For this reason, the compact camera incorporates an AF distance measuring unit in an optical system independent from the photographing optical system including a photographing lens. That is, a compact camera normally adopts an AF scheme which controls the photographing lens in accordance with an output signal from the distance measuring unit. Such an AF scheme will be referred to as an external light AF scheme hereinafter.

In recent years, it is understood that these imager and external light AF schemes suffer drawbacks. The drawbacks of these AF schemes are as follows.

The imager AF scheme basically attains AF using an image sensing element for photographing. For this reason, when the photographing lens is largely defocused from an object, AF control using the imager AF scheme cannot be made. When the photographing lens is largely defocused from an object, the image sensing element cannot acquire a clear image of the object. The imager AF scheme can determine the focusing direction only after the photographing lens has moved. Furthermore, the imager AF scheme is limited in capture time of an object image since it attains AF while moving the photographing lens. For this reason, the imager AF scheme requires a long focus adjustment time. In addition, when the imager AF scheme is used, it is difficult to detect a principal object by comparing the distances to objects present at a plurality of points.

On the other hand, the external light AF scheme allows high-speed distance measuring since it uses a sensor dedicated to AF. However, the external light AF scheme cannot cancel errors such as position errors of the photographing lens due to changes in environment such as temperature and humidity; errors depending on the photographing posture or the like; and similar errors, since it does not execute feedback control of the photographing lens.

In order to eliminate these drawbacks, Jpn. Pat. Appln. KOKAI Publication No. 2000-321482 discloses a technique that uses the imager and external light AF schemes in combination. That is, the technique disclosed in this reference executes coarse distance measuring using the external light AF scheme, and then final focus adjustment using the imager AF scheme.

BRIEF SUMMARY OF THE INVENTION

It is an object of the present invention to provide a technique which can attain high-speed, accurate focus adjustment of a principal object while canceling position errors and the like of a photographing lens by effectively using the external light and imager AF schemes.

According to a first aspect of the present invention, there is provided an image sensing apparatus having a distance measuring unit, comprising:

an image sensing element to form an object image which enters via a photographing optical system;

a distance measuring unit to measure distances to a plurality of points within a photographing frame using an optical path different from an optical path of the photographing optical system;

a determination unit to determine a relationship between a distance measuring result of the distance measuring unit and a drive amount of the photographing optical system, on the basis of the distance measuring result upon measuring a distance to a first point of the plurality of points by the distance measuring unit and a change in contrast of the object image formed at a position corresponding to the first point on the image sensing element when a focal point position of the photographing optical system has changed; and a control unit to control the focal point position of the photographing optical system, on the basis of a distance measuring result of the distance measuring unit at a second point of the plurality of points, which is different from the first point and the relationship determined by the determination unit.

According to a second aspect of the present invention, there is provided an image sensing apparatus having a distance measuring unit, comprising:

an image sensing element to form an object image which enters via a photographing optical system;

a distance measuring unit to measure distances to a plurality of points within a photographing frame using an optical path different from an optical path of the photographing optical system;

a first selection unit to select a point where a principal object is present as a first point on the basis of distance measuring results of the distance measuring unit;

a second selection unit to select, as a second point, a point which is nearer a position of the photographing optical system before control starts than the first point; and a control unit to control a focal point position of the photographing optical system, in accordance with contrast information in a region corresponding to the second point, a distance measuring result of the distance measuring unit at the first point, and a distance measuring result of the distance measuring unit at the second point.

According to a third aspect of the present invention, there is provided an image sensing apparatus having a distance measuring unit, comprising:

an image sensing element to form an object image which enters via a photographing optical system;

a light projection unit to project light toward the object;

a distance measuring unit to execute a first distance measuring process that measures a distance to the object using an optical path different from an optical path of the photographing optical system without projecting light from the light projection unit to the object, and a second distance measuring process that measures a distance to the object while projecting light from the light projection unit to the object;

a determination unit to displace a focal point position of the photographing optical system on the basis of the first distance measuring result prior to the second distance measuring process, to detect a change in contrast of the object image formed on the image sensing element at that time, and to determine a relationship between a distance measuring result of the distance measuring unit and a drive amount of the photographing optical system on the basis of the first distance measuring result and the change in contrast; and a control unit to control a focal point position of the photographing optical system on the basis of the second distance measuring result and the relationship determined by the determination unit.

According to a fourth aspect of the present invention, there is provided an image sensing apparatus having a distance measuring unit, comprising:

an image sensing element to convert an object image obtained via a photographing lens into an electrical signal;

a contrast detection unit to detect a contrast of object on the basis of an output from the image sensing element;

an object distance detection unit which is provided in an optical path different from an optical path of the photographing lens and is to detect a distance to the object;

a first focal point position determination unit to control a position of the photographing lens on the basis of the distance to the object detected by the object distance detection unit, to make the contrast detection unit detect the contrast of the object at the controlled photographing lens position, to make the contrast detection unit then detect contrasts of the object at least at four photographing lens positions, and to determine a first focal point position of the photographing lens on the basis of a change in detected contrast of the object; and a second focal point position determination unit to determine a second focal point position of the photographing lens on the basis of the distance to the object, the first focal point position, and a new distance to the object detected by the object distance detection unit, after the first focal point position determination unit determines the first focal point position.

According to a fifth aspect of the present invention, there is provided an image sensing apparatus having a distance measuring unit, comprising:

a distance measuring unit to obtain an object distance using an optical system different from a photographing lens;

a focal point position detection unit to obtain a focal point position of an object on the basis of contrast information obtained via the photographing lens;

a release switch operated at a photographing start timing of the object; and an arithmetic control unit to calculate a focal point position of the photographing lens, on the basis of the object distance obtained by operating the distance measuring unit before operation of the release switch, the focal point position obtained by operating the focal point position detection unit before operation of the release switch, and the object distance obtained by operating the distance measuring unit after operation of the release switch.

According to a sixth aspect of the present invention, there is provided an image sensing apparatus having a distance measuring unit, comprising:

an image sensing unit to convert an object image which enters via a photographing lens into an electrical signal;

a contrast detection unit to detect contrast information from an output of the image sensing unit;

a first focal point control unit to execute first focal point position adjustment of the photographing lens on the basis of the contrast information detected by the contrast detection unit;

an object distance detection unit to detect an object distance using an optical path different from an optical path of the photographing lens;

a second focal point control unit to execute second focal point position adjustment of the photographing lens on the basis of the object distance detected by the object distance detection unit; and a control unit to execute, in an initial focal point adjustment operation, the second focal point position adjustment using the second focal point control unit and then the first focal point position adjustment using the first focal point control unit, and to execute, in a subsequent focal point adjustment operation, focal point position adjustment by correcting a focal point position controlled by the second focal point control unit on the basis of a relationship between focal point positions of the photographing lens, which are obtained by the first focal point position adjustment and the second focal point position adjustment in the initial focal point adjustment operation.

According to a seventh aspect of the present invention, there is provided an image sensing apparatus having a distance measuring unit, comprising:

an image sensing unit to convert an object image which enters via a photographing lens into an electrical signal;

a contrast detection unit to detect contrast information from an output of the image sensing unit;

a first focal point control unit to execute focal point position adjustment of the photographing lens on the basis of the contrast information detected by the contrast detection unit;

an object distance detection unit to detect an object distance using an optical path different from an optical path of the photographing lens;

a second focal point control unit to execute focal point position adjustment of the photographing lens on the basis of the object distance detected by the object distance detection unit; and a control unit to execute focal point adjustment using both the first and second focal point control units in an initial focal point adjustment operation, and to execute focal point position adjustment using the second focal point control unit on the basis of a relationship between focal points determined by the first and second focal point control units in a subsequent focal point adjustment operation.

According to an eighth aspect of the present invention, there is provided an image sensing apparatus having a distance measuring unit, comprising:

an image sensing unit to convert an object image which enters via a photographing lens into an electrical signal;

a contrast detection unit to detect contrast information from an output of the image sensing unit;

an object distance detection unit to detect an object distance using an optical path different from an optical path of the photographing lens; and a control unit to initially execute a first focal point adjustment operation of the photographing lens using outputs from the object distance detection unit and the contrast detection unit, and to subsequently execute a second focal point adjustment operation of the photographing lens using only the output from the object distance detection unit when the output from the object distance detection unit or the contrast detection unit meets a predetermined condition.

According to a ninth aspect of the present invention, there is provided an image sensing apparatus having a distance measuring unit, comprising:

an image sensing element;

a photographing optical system to form an object image on an imaging surface of the image sensing element;

a drive unit to change a focal point position of the photographing optical system;

an image processing unit to generate image data from an output signal of the image sensing element;

a distance measuring optical system having an optical path different from an optical path of the photographing optical system;

a distance measuring unit to measure a distance at a specific point of an object field via the distance measuring optical system; and a CPU connected to the drive unit, the image processing unit, and the distance measuring unit, the CPU determining a position error of the photographing optical system with respect to a distance measuring result of the distance measuring unit, on the basis of the distance measuring result to the specific point obtained by the distance measuring unit and a change in contrast of the image data obtained upon changing the focal point position of the photographing optical system by controlling the drive unit.

According to a tenth aspect of the present invention, there is provided a method of controlling an image sensing apparatus, which has a distance measuring unit to measure an object distance via a distance measuring optical system different from an optical path of a photographing optical system, comprising:

measuring an object distance at a specific point of an object field via the distance measuring optical system;

searching for a highest-contrast lens position while displacing the photographing optical system; and calculating position error information of the photographing optical system on the basis of the measured object distance and the searched lens position.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A shows the measurement range of the sensor arrays in external light AF control;

FIG. 3B is a graph showing the object distance distribution detected by the external light AF control;

FIG. 4A shows the structure of an AF optical system;

FIG. 4B shows the structure of a photographing optical system;

FIG. 11 shows the structure of a hybrid AF unit;

FIG. 12 is a flowchart of focus adjustment control in the third embodiment of the present invention;

FIG. 15 is a flowchart of focus adjustment control in the fourth embodiment of the present invention;

FIG. 21A is a timing chart of photographing control when the imager AF control is done in each focus adjustment;

FIG. 21B is a timing chart of photographing control when the focus adjustment speed-up technique according to the fifth embodiment of the present invention is applied;

FIG. 21C is a timing chart of photographing control when a photographing lens returns to a previous position upon completion of photographing;

FIG. 24A shows a photographing scene before an object moves;

FIG. 24B shows a photographing scene after an object moved;

FIG. 25 is a flowchart of focus adjustment control in the sixth embodiment of the present invention;

FIG. 30 is a flowchart showing a control sequence of one display process in the camera of the modification;

FIG. 31 is an explanatory view showing a photographing scene with a large change in light;

FIG. 32A is an explanatory view showing a display example of a screen when an image of a person is overexposed to hide facial expression;

FIG. 32B is an explanatory view showing a display example of a screen when a background suffers highlight saturation and disappears; and FIG. 33 is a flowchart showing a control sequence of another display process in the camera of the modification.

DETAILED DESCRIPTION OF THE INVENTION

Preferred embodiments of the present invention will be described hereinafter with reference to the accompanying drawings.

First Embodiment

Figure 1:
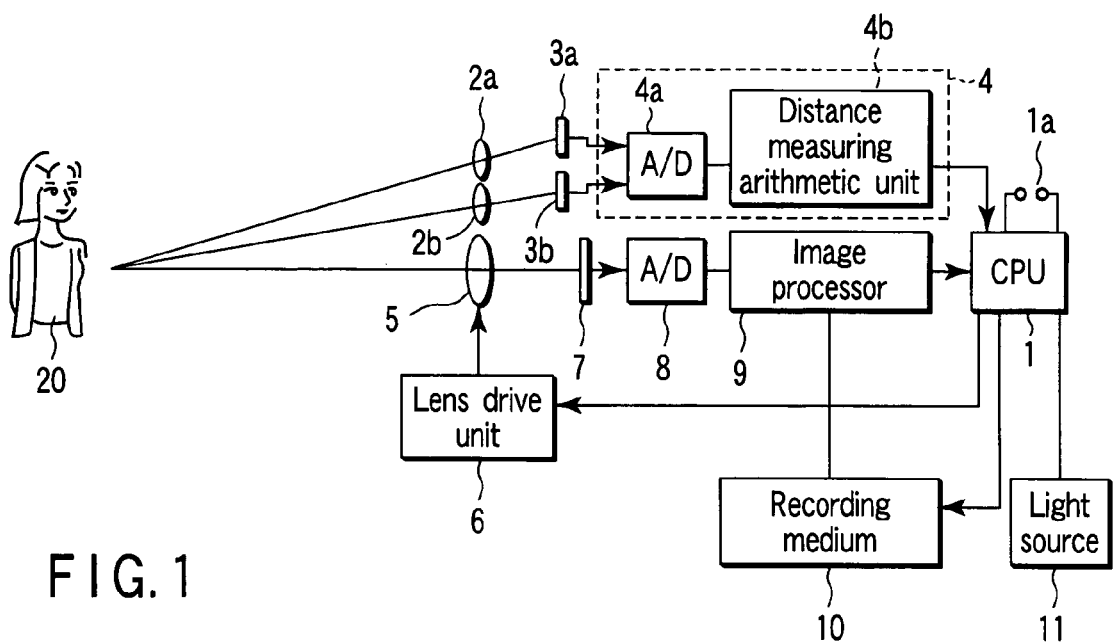
FIG. 1 is a block diagram showing the internal arrangement of a camera as an example of an image sensing apparatus according to the first embodiment of the present invention.

FIG. 1 is a block diagram showing the internal arrangement of a camera as an example of an image sensing apparatus according to the first embodiment of the present invention. That is, this camera comprises a microprocessor (CPU) 1, light-receiving lenses 2a and 2b, sensor arrays 3a and 3b, a distance measuring unit 4, a photographing lens 5, a lens drive (LD) unit 6, an image sensing element 7, an analog-to-digital converter 8, an image processor 9, a recording medium 10, and a light source 11.

The CPU 1 is an arithmetic controller for controlling the sequence of the overall camera. A release switch 1a used to start photographing sequences is connected to the CPU 1. The CPU 1 starts a series of photographing sequences by detecting the ON state of the release switch 1a by the photographer.

The pair of light-receiving lenses 2a and 2b receive an image from an object 20 and form the received images on the pair of sensor arrays 3a and 3b. The pair of sensor arrays 3a and 3b convert formed images into electrical signals and output the signals to the distance measuring unit 4. This electrical signal will be referred to as an image signal hereinafter.

The distance measuring unit 4 is a so-called passive distance measuring unit, which comprises an analog-to-digital converter 4a and distance measuring arithmetic unit 4b. The analog-to-digital converter 4a in the distance measuring unit 4 converts the image signals input from the sensor arrays 3a and 3b into digital signals, and outputs the digital signals to the distance measuring arithmetic unit 4b. The distance measuring arithmetic unit 4b calculates the distance from the camera to the object 20, i.e., an object distance, using the principle of triangulation on the basis of the input digital signals. The principle of triangulation will be described later.

After the object distance is calculated by the distance measuring arithmetic unit 4b, the CPU 1 makes focus adjustment of the photographing lens 5 on the basis of this object distance. That is, the CPU 1 controls the LD unit 6 on the basis of the object distance calculated by the distance measuring arithmetic unit 4b to adjust the focal point position of the photographing lens 5.

Upon completion of focus adjustment of the photographing lens 5, the CPU 1 starts an exposure operation. In this exposure operation, the image sensing element 7 converts an image of the object 20 formed on it into an electrical image signal, and outputs the image signal to the analog-to-digital converter 8.

The analog-to-digital converter 8 converts the image signal into a digital signal, and outputs the digital signal to the image processor 9. The image processor 9 executes image processes such as color correction, halftone correction, and the like of an image on the basis of the input digital signal. The image processor 9 then compresses the processed image signal, and records that image signal on the recording medium 10. In this manner, the exposure operation is completed.

The light source 11 comprises a flash device or the like. The light source 11 projects auxiliary light for exposure or distance measuring toward the object 20 in accordance with a photographing scene.

Figure 2A:
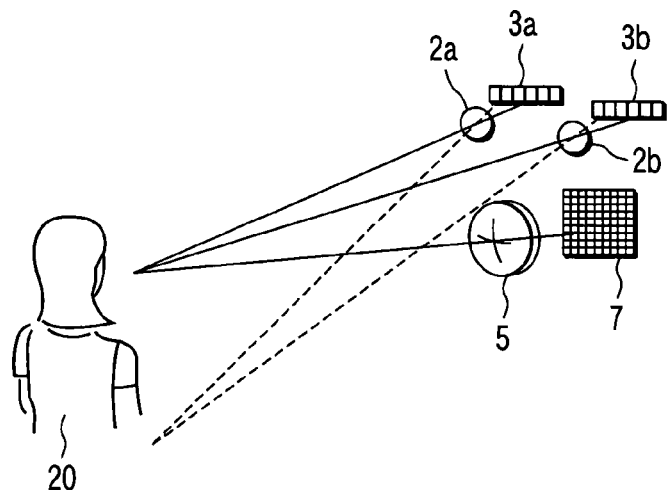
FIG. 2A is a view for explaining the positional relationship between light-receiving lenses and sensor arrays, and between a photographing lens and image sensing element.

The positional relationship between the light-receiving lenses 2a and 2b, and sensor arrays 3a and 3b, and that between the photographing lens 5 and image sensing element 7 are as shown in FIG. 2A. At this time, the sensor arrays 3a and 3b, and the image sensing element 7 can detect an image of an identical object 20. When the outputs from the sensor arrays 3a and 3b are used to calculate an object distance, an object image formed at a position indicated by the broken lines in FIG. 2A is used in place of the image of the object 20 formed at a position indicated by the solid lines in FIG. 2A, thus detecting the distance to an object other than the object 20.

Figure 2B:
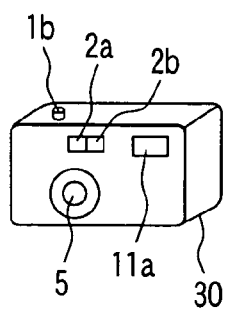
FIG. 2B shows an outer appearance of a camera in the first embodiment.

FIG. 2B shows the outer appearance of the camera according to the first embodiment. That is, a release button 1b used to operate the aforementioned release switch 1a is provided on the upper surface of a camera 30. The aforementioned photographing lens 5 and light-receiving lenses 2a and 2b are provided on the front surface of the camera 30 to have the positional relationship shown in FIG. 2A. Furthermore, an emission window 11a for the light source 11 is formed on the front surface of the camera 30.

An external light AF unit detects an object distance based on the principle of triangulation using the pair of light-receiving lenses 2a and 2b and the pair of sensor arrays 3a and 3b like the two eyes of a person, and adjusts the focal point position of the photographing lens 5 on the basis of the object distance.

On the other hand, the aforementioned imager AF control detects the contrast of an object image formed on the image sensing element 7 while changing the position of the photographing lens 5 via the LD unit 6, and detects the position of the photographing lens 5 corresponding to the highest contrast to determine a focal point position. That is, this imager AF control is focus adjustment control based on a principle different from that of the external light AF control, which determines a focal point position on the basis of the object distance.

With such imager AF control, even when the position control of the photographing lens 5 has suffered any error, if that error is small, the focal point position can be detected in consideration of that error. However, when a person 20a as a principal object is present at a position other than the central portion in a photographing frame 21, as shown in FIG. 3A, it is difficult for the imager AF control to quickly bring the photographing lens 5 into focus on the person 20a. In such case, the imager AF control executes the aforementioned contrast detection for the person 20a and a tree 20b as a background object, respectively, so as to specify a principal object. Then, the control determines which of these objects is a principal object, i.e., which of the objects is located closer to the camera. At this time, since images are temporarily captured at focal point positions corresponding to these objects to execute contrast detection, the imager AF control requires a long focus adjustment time.

By contrast, the external light AF control determines an object distance by detecting image signals from the sensor arrays 3a and 3b shown in FIG. 2A, and detecting a difference between the image signals of an object on the basis of the parallax between the light-receiving lenses 2a and 2b. That is, the photographing lens 5 is driven only after the focal point position is determined. For this reason, a time required for focus adjustment is shorter than that in the imager AF control. Also, the distance to an object other than a principal object can be detected by only switching image signals of an object used in the object distance calculation. For this reason, the external light AF control can detect an object distance distribution over a broad region 3c shown in FIG. 3A.

FIG. 3B shows an example of the distance distribution obtained as described above. When the distance distribution shown in FIG. 3B is obtained, the location of a principal object can be detected at high speed. However, it is difficult for the method of obtaining the distance distribution using image signals to detect the distance to a low-contrast object. Hence, for example, the light source 11 such as a flash device or the like irradiates an object with light, and detects light reflected by the object, so as to detect the object distance. That is, the amount of reflected light obtained from a distant object is small, and that of reflected light obtained from a near object is large. Hence, a correct object distance can be detected from even a low-contrast object. Also, it may be determined that a low-contrast object is not a principal object.

As a method of detecting a principal object in the imager AF control, a method of detecting a principal object from a pattern of an image signal, a method of detecting a principal object from color information of an image, and the like are known. In general, these methods can detect a principal object quicker than the method of determining a principal object from the distance distribution. Since these methods can use state-of-the-art techniques, a detailed description thereof will be omitted.

FIG. 4A shows the structure of an external light AF optical system including the light-receiving lens 2a, and FIG. 4B shows the structure of a photographing optical system including the photographing lens 5. Note that FIG. 4A shows only an optical system including the light-receiving lens 2a. By replacing the light-receiving lens 2a by the light-receiving lens 2b in FIG. 4A, the same explanation can be applied to the light-receiving lens 2b.

Since the photographing optical system shown in FIG. 4B has a relatively small f-number, the lens is bright, and a focal point position is not fixed at a pan focus position unlike in the external light AF optical system shown in FIG. 4A. For this reason, when positional deviation ΔLD has occurred due to an error or the like upon drive control of the photographing lens 5, an object image is formed on the image sensing element 7 not normally but with spread $b_2$. On the other hand, even when the external light AF optical system is used, spread $b_1$ is formed. However, $b_2$ is much larger than $b_1$. That is, when the photographing lens 5 largely defocuses, the external light AF scheme can normally detect contrast, but the imager AF scheme cannot normally detect contrast.

Figure 5:
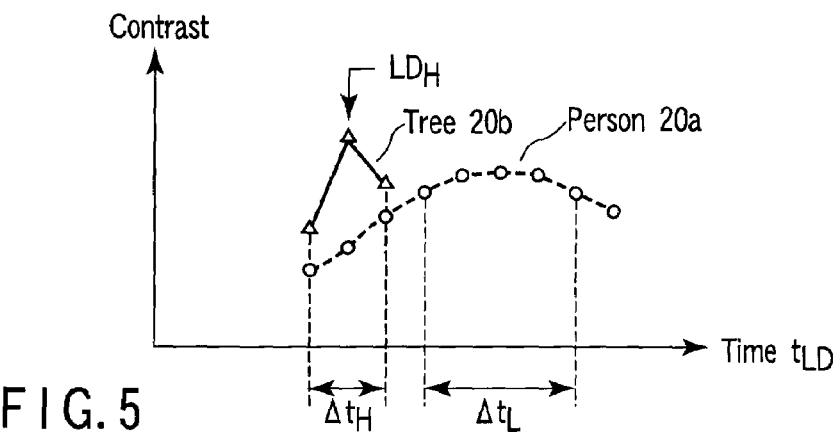
FIG. 5 is a graph showing a change in contrast along with an elapse of time in imager AF control.

The person 20a and tree 20b shown in FIG. 3A have different contrast values. FIG. 5 shows the distribution of changes in contrast in the imager AF control. The abscissa in FIG. 5 plots an elapsed time, and its ordinate plots the contrast of an object. In this case, the contrast of the person 20a changes smoothly along with an elapse of time, and the contrast of the tree 20b changes abruptly. That is, as a time required to detect a maximum contrast value, time $\Delta t_L$ is required to detect the maximum contrast value of the person 20a, and time $\Delta t_H$ is required to detect the maximum contrast value of the tree 20b. In this way, ease in focus adjustment varies depending on objects and, hence, the focus adjustment time varies depending on objects.

Figure 6:
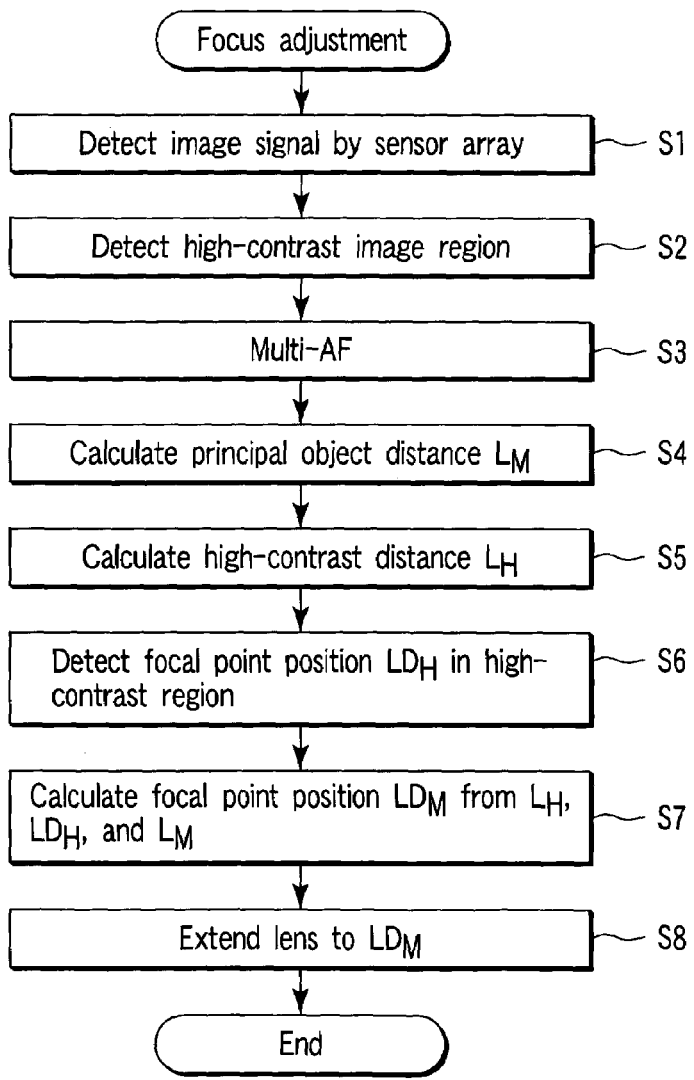
FIG. 6 is a flowchart of focus adjustment control of the camera according to the first embodiment of the present invention.

Based on the aforementioned characteristics, control that combines the external light and imager AF schemes to compensate for their drawbacks is carried out. The control that combines these AF schemes allows high-speed principal object detection and high-speed focus adjustment. Furthermore, the control that combines these AF schemes allows focus adjustment in consideration of an extension error of the photographing lens. FIG. 6 is a flowchart showing the sequence of such focus adjustment control.

In this flowchart, upon detection of the ON state of the release switch 1a by the photographer, the CPU 1 detects image signals of an object in the region 3c in FIG. 3A using the external light AF scheme, i.e., the sensor arrays 3a and 3b (step S1).

The CPU 1 detects a point where an image signal corresponding to a maximum contrast level of those detected in step S1 is output (in the example in FIG. 3A, the tree 20b is a point where a maximum image signal is output) (step S2). The CPU 1 then executes multi-AF control based on the image signals detected in step S1 to obtain the distance distribution shown in FIG. 3B (step S3).

The CPU 1 detects the nearest distance of the distance distribution obtained in step S3 as an object distance $L_M$ (step S4). An object present at this distance is a principal object (in the example of FIG. 3A, the person 20a is a principal object). The CPU 1 calculates an object distance $L_H$ of an object corresponding to a maximum contrast point in the distance distribution obtained in step S3 (step S5).

The CPU 1 detects a focal point position $LD_H$ in a region including the maximum contrast point (step S6). This detection is attained by detecting a maximum contrast level at that time while making the drive control of the photographing lens 5. The CPU 1 calculates a focal point position $LD_M$ for the principal object on the basis of $L_M$, $L_H$, and $LD_H$ (step S7).

The method of calculating $LD_H$ and $LD_M$ in steps S6 and S7 will be described below with reference to FIG. 7.

Figure 7:
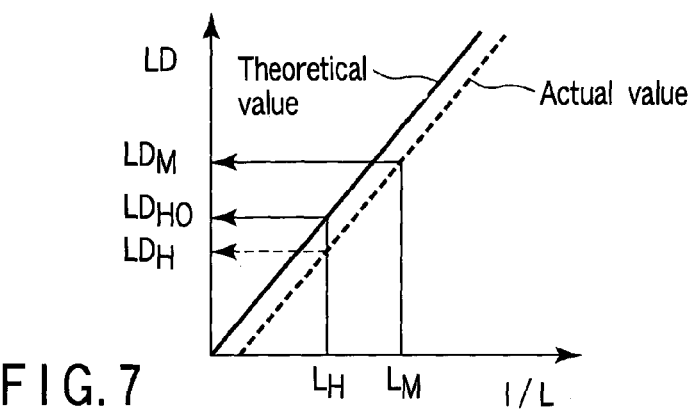
FIG. 7 is a graph for explaining the relationship between the reciprocal of an object distance, and focal point position.

In general, a reciprocal 1/L of an object distance L, and a focal point position LD have a linear relationship, as indicated by the solid line in FIG. 7 and, at this time, we have:

$$LD = A \times 1/L + B \quad (1)$$

where A and B are constants. However, this linear relationship suffers errors depending on conditions such as changes in temperature and humidity, the photographing posture of the photographer, and the like, and is not always the same. Hence, in consideration of an error ΔLD at that time, the relationship indicated by the solid line in FIG. 7 changes to that indicated by the broken line in FIG. 7.

That is, as described above, in the first embodiment, the imager AF control is made in the region including the maximum contrast point to detect the focal point position $LD_H$, and the error ΔLD is calculated by calculating the difference between this focal point position $LD_H$ and theoretical value $LD_{HO}$. Thus, the error ΔLD can be calculated by:

$$\Delta LD = LD_H - LD_{HO} \quad (2)$$

From the error ΔLD calculated in this way, the focal point position $LD_M$ of the principal object can be calculated by:

$$LD_M = A \times 1/L_M + B + \Delta LD \quad (3)$$

The description will revert to FIG. 6. After the focal point position $LD_M$ of the principal object is calculated, the CPU 1 controls to extend the photographing lens 5 to adjust the focal point position of the photographing lens 5 to the focal point position $LD_M$ (step S8), thus ending the focus adjustment control of this flowchart. After that, the same exposure operation as in the prior art is done.

Figure 8A:
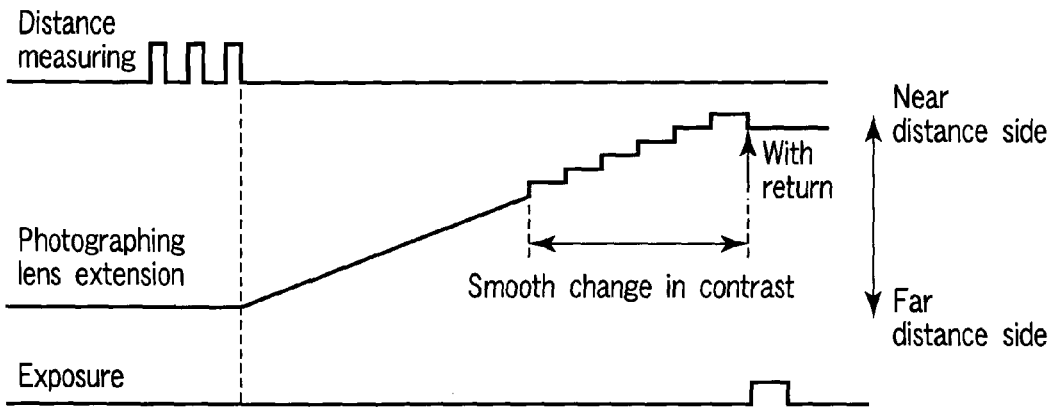
FIG. 8A is a timing chart of conventional focus adjustment control.
Figure 8B:
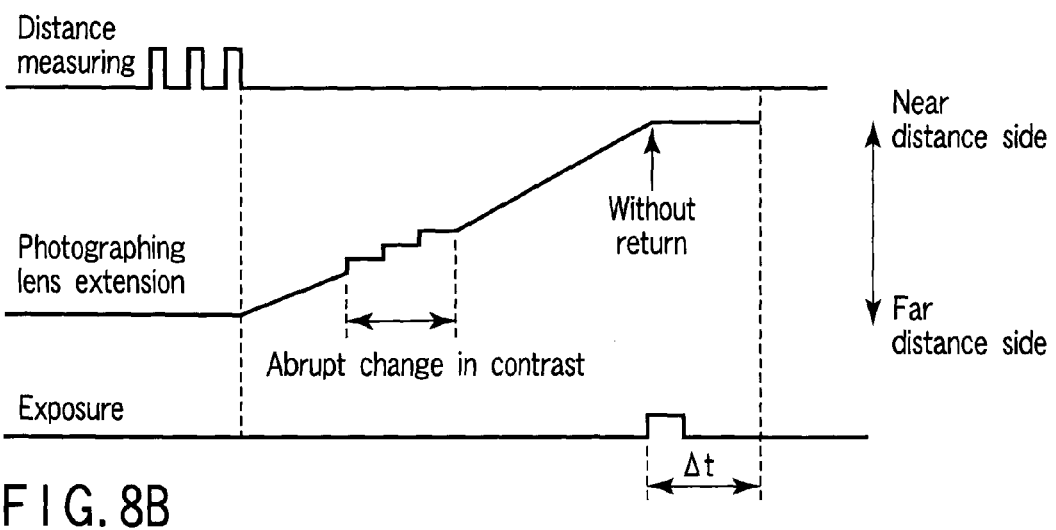
FIG. 8B is a timing chart of the focus adjustment control in the first embodiment of the present invention.

FIGS. 8A and 8B are timing charts of cases without and with the focus adjustment speed-up technique used in the camera according to the first embodiment.

In FIGS. 8A and 8B, times required until a principal object is detected by the external light AF control are equal to each other. However, when the speed-up technique is not applied, the detected principal object undergoes the imager AF control, and the focus adjustment control is then executed. At this time, since the contrast of the principal object (person 20a) changes smoothly, a long time is required to detect a maximum contrast point, i.e., the focal point position $LD_M$. Furthermore, after the maximum contrast point is detected, control for returning the photographing lens 5 to the focal point position $LD_M$ must be done.

On the other hand, when the speed-up technique is applied, after the external light AF control, only a region including a maximum contrast output point undergoes the imager AF control to detect the focal point position $LD_H$. After that, the focal point position $LD_M$ of the principal object is calculated on the basis of the detected focal point position $LD_H$, and the photographing lens 5 undergoes the drive control to the focal point position $LD_M$ without returning. Hence, the focus adjustment time can be shortened by a total of the maximum contrast detection time and the return time of the photographing lens 5, i.e., time Δt.

As described above, according to the first embodiment, the focus adjustment of the photographing lens is done by appropriately combining the external light passive AF control and the imager control. In this way, high-speed focus adjustment can be attained while canceling position errors and the like upon driving the photographing lens.

Second Embodiment

The second embodiment of the present invention will be described below. In the first embodiment described above, AF control is carried out using the external light passive scheme. The second embodiment will exemplify a case wherein the AF control is done using an active scheme that requires light projection onto an object. The arrangement other than the active AF control in the second embodiment is the same as that in the first embodiment described above.

Figure 9A:
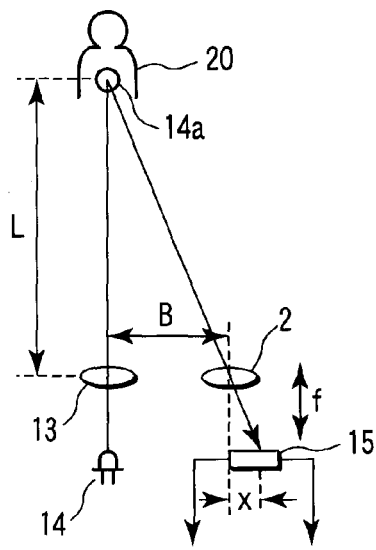
FIG. 9A shows the structure of an active AF unit.

FIG. 9A shows the arrangement of an external light active AF unit in a camera according to the second embodiment. That is, light emitted by an infrared light-emitting diode (IRED) 14 is projected onto an object 20 via a projection lens 13. This light is projected onto the object 20 like a pattern 14a, and is then reflected by the object 20. Reflected signal light at that time is received by a semiconductor optical position sensitive device (PSD) 15 via a light-receiving lens 2 separated a base length B from the projection lens 13. By detecting an incident position x of the reflected signal light received by the PSD 15, an object distance L is calculated using the principle of triangulation. That is, the object distance L is calculated using:

$$L = B \cdot f/x \quad (4)$$

where f is the focal length of the light-receiving lens 2.

Figure 9B:
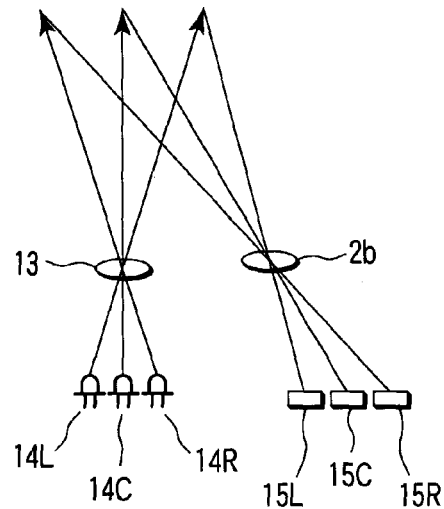
FIG. 9B shows the structure upon executing active multi-AF control.

In order to measure the distances to a plurality of points (e.g., three points), three IREDs (IREDs 14L, 14C, and 14R), and three PSDs (PSDs 15L, 15C, and 15R) need only be prepared, as shown in FIG. 9B, on the basis of the same concept. By detecting the incident positions of reflected light beams of signal light projected onto these points, the aforementioned distance distribution can be obtained. Since the active AF control achieves distance measuring by utilizing reflected light of light projected onto an object, distance measuring can be made if an object is a low-contrast one.

Figure 10:
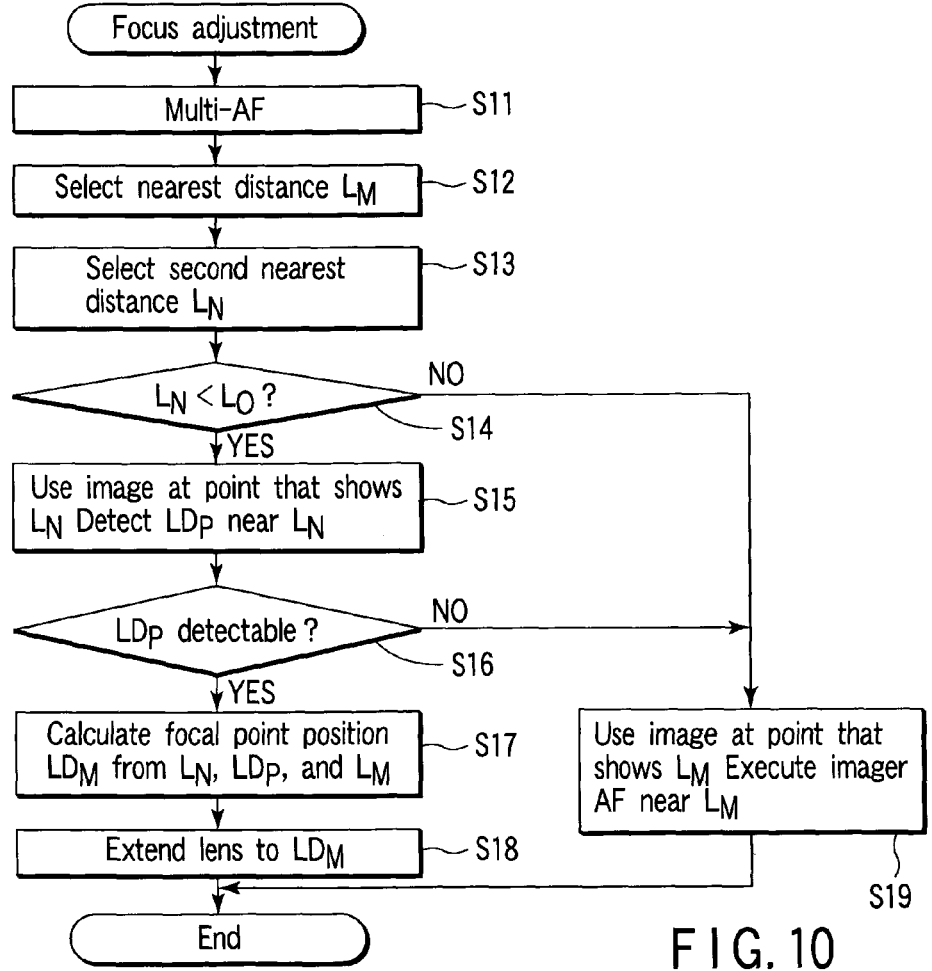
FIG. 10 is a flowchart of focus adjustment control in the second embodiment of the present invention.

The focus adjustment control sequence using the active AF control in the second embodiment will be described below with reference to FIG. 10.

In this flowchart, upon detection of the ON state of the release switch 1a, the CPU 1 executes multi-AF control (three-point multi-AF control in the example in FIG. 9B) using the external light active AF scheme (step S11). The CPU 1 selects a nearest distance $L_M$ from the multi-AF results (step S12). Furthermore, the CPU 1 selects the second nearest distance $L_N$ from the multi-AF results (step S13). Note that this object distance $L_N$ corresponds to the object distance $L_H$ at the maximum contrast point. Normally, an object present at the nearest distance position is often a principal object. Also, an object with high contrast such as a tree is often detected as a near-distance object. Hence, the nearest distance is determined as the object distance $L_M$ where a principal object is present. Furthermore, the second nearest distance $L_N$ is determined as the object distance $L_H$ at the maximum contrast point.

Note that an object distance at a point where a change in contrast is large and which is nearest the current position of the photographing lens 5 may be determined as the object distance $L_N$ in place of the second nearest distance of the principal object as the object distance $L_N$ at the maximum contrast point.

In case of active AF, since the amount of reflected light decreases for an object at a distance farther than a predetermined distance, the distance measuring precision impairs. Hence, after the object distance $L_N$ is selected, the CPU 1 checks if the object distance $L_N$ is equal to or smaller than a predetermined distance $L_O$ (step S14). If it is determined that the object distance $L_N$ is equal to or smaller than the predetermined distance $L_O$, the focus adjustment control can be done in the sequence of FIG. 8B that adopts the speed-up technique. More specifically, the CPU 1 executes the imager AF control near the point where the object distance $L_N$ is output, and detects a position $LD_P$ of a maximum contrast level as a result of the imager AF control (step S15). Upon driving the photographing lens 5 in the imager AF control in step S15, the lens 5 is driven from the far distance side.

The CPU 1 checks if $LD_P$ can be detected (step S16). If it is determined that $LD_P$ can be detected, the CPU 1 calculates a focal point position $LD_M$ of the principal object in accordance with the sequence in step S7 in FIG. 6 above (step S17). Note that the focal point position $LD_P$ in the second embodiment corresponds to the focal point position $LD_H$ in the first embodiment.

After the focal point position $LD_M$ of the principal object is calculated, the CPU 1 controls the photographing lens 5 to extend to the focal point position $LD_M$ (step S18), thus ending the focus adjustment control of this flowchart.

On the other hand, if it is determined in step S14 that the object distance $L_N$ is larger than the predetermined distance $L_O$ or if it is determined in step S16 that $LD_P$ cannot be detected, the CPU 1 executes the focus adjustment control in the sequence of FIG. 8A that does not adopt the speed-up technique. That is, the CPU 1 executes the imager AF control for the principal object to focus on the principal object (step S19), thus ending the focus adjustment control of this flowchart.

As described above, according to the second embodiment, when the active AF control is used as the external light AF scheme, high-speed focus adjustment can be attained while canceling errors upon driving the photographing lens.

Third Embodiment

The third embodiment of the present invention will be described below. The third embodiment of the present invention assumes a so-called hybrid camera, which uses active and passive AF schemes in combination. Since other arrangements in the third embodiment are the same as those in the first embodiment, a description thereof will be omitted.

FIG. 11 shows the arrangement of a hybrid AF unit according to the third embodiment. In this AF unit in FIG. 11, a steady light storage circuit 18 is connected to respective pixels of the sensor arrays 3a and 3b used in the passive AF control. With this steady light storage circuit 18, only reflected light of light pulses emitted by a light-emitting diode (LED) 16 are output to a difference circuit 19.

In the third embodiment, a mask 17 is inserted to assign a predetermined pattern to light emitted by the LED 16. The LED 16 is driven by an LED driver 16a. The LED 16, which is controlled by this LED driver 16a, projects light with a predetermined pattern formed by the mask 17 onto the object 20 while being focused via the projection lens 13. At this time, light with a pattern 16b shown in FIG. 11 is projected onto the object 20. After that, the light with the pattern 16b is projected onto the object 20, and only reflected light components of the light with the pattern 16b are extracted by the steady light storage circuit 18 and difference circuit 19. At this time, light components which steadily enter the camera are removed. With this arrangement, even when the object 20 has low contrast, an image of the object 20 can be detected from the sensor arrays 3a and 3b.

The subsequent operations are substantially the same as those in the circuit shown in FIG. 1. The output from the difference circuit 19 is converted into a digital signal by the analog-to-digital converter 4a, and the digital signal is output to the CPU 1. The CPU 1 calculates an object distance, focal point position, and the like on the basis of this output.

In a bright scene or the like, the steady light storage circuit 18 need not operate. In such case, the AF unit of FIG. 11 makes the same operations as in the aforementioned passive AF control. That is, the object distance can be calculated based on the principle of triangulation.

FIG. 12 is a flowchart showing the focus adjustment control sequence in the camera according to the third embodiment.

In this flowchart, upon detection of the ON state of the release switch 1a, the CPU 1 detects an image of the object 20 using the sensor arrays 3a and 3b (step S21). The CPU 1 then executes multi-AF control in a passive mode, i.e., without storing steady light (step S22).

The CPU 1 checks if distance measuring has succeeded in step S22, i.e., if a low-contrast region is present (step S23). This checking process is implemented by examining if an image signal output of the central portion of the photographing frame where a principal object is more likely to be present is equal to or lower than a predetermined value. If it is determined as a result of checking in step S23 that a low-contrast region is present, the CPU 1 executes active AF control by projecting light from the LED 16. (step S24), and the flow then advances to step S25.

In the active AF mode, the steady light storage circuit 18 and difference circuit 19 remove steady light components, which steadily enter the camera. As a result, since only reflected light signal components according to the predetermined pattern are input to the analog-to-digital converter 4a, an object distance even to a low-contrast object can be calculated.

On the other hand, if it is determined in step S23 that no low-contrast region is present, the flow jumps to step S25.

The CPU 1 selects the nearest distance $L_M$ from distance measuring results at a plurality of points (step S25). The CPU 1 selects the second nearest distance $L_N$ (step S26). The CPU 1 executes the imager AF control near a point where the object distance $L_N$ is output, thus detecting a focal point position $LD_P$ (step S27).

After the focal point position $LD_P$ is detected, the CPU 1 calculates a focal point position $LD_M$ of the principal object in accordance with the sequence in step S27 in FIG. 6 above (step S28). The CPU 1 controls the photographing lens 5 to extend to the focal point position $LD_M$ (step S29), thus ending the focus adjustment control in this flowchart.

As described above, according to the third embodiment, when the hybrid scheme is used as the external light AF scheme, high-speed focus adjustment can be achieved while canceling errors upon driving the photographing lens.

Fourth Embodiment

Figure 13:
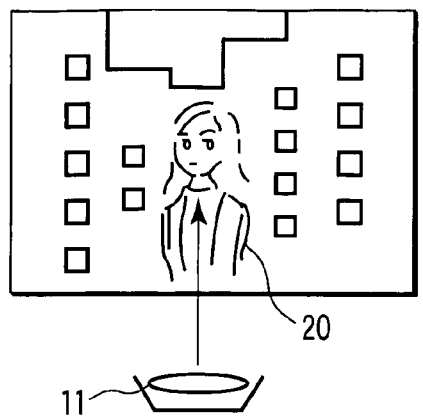
FIG. 13 is an explanatory view for explaining the concept of the fourth embodiment of the present invention.

The imager AF control does not work well in a photographing scene that includes a night scene as a background, as shown in FIG. 13, in addition to the aforementioned scene including a plurality of objects. The fourth embodiment applies the aforementioned speed-up technique in such night scene. Since the arrangement of the camera according to the fourth embodiment is the same as that of the first embodiment, a description thereof will be omitted.

More specifically, in the arrangement shown in FIG. 1, the light source 11 projects light toward the principal object (person) 20, and light reflected by the principal object 20 is detected. In this way, accurate focus adjustment can be done by applying the speed-up technique. In the night scene shown in FIG. 13, the sensor arrays 3a and 3b for the external light AF control detect an image signal shown in FIG. 14A, since light coming from windows in the background is detected. On the other hand, when auxiliary light is projected from the light source 11 toward the object, the sensor arrays 3a and 3b detects an image signal shown in FIG. 14B.

Figure 14A:
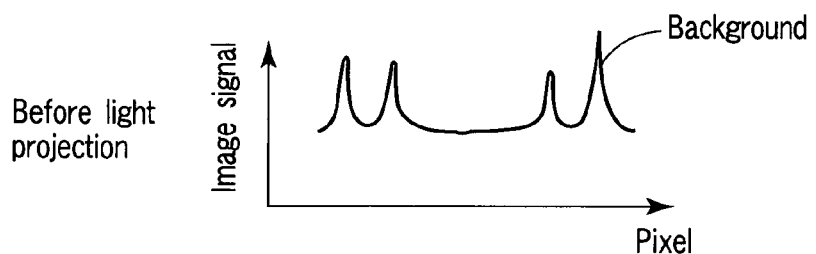
FIG. 14A shows an image signal obtained before light is projected onto an object.
Figure 14B:
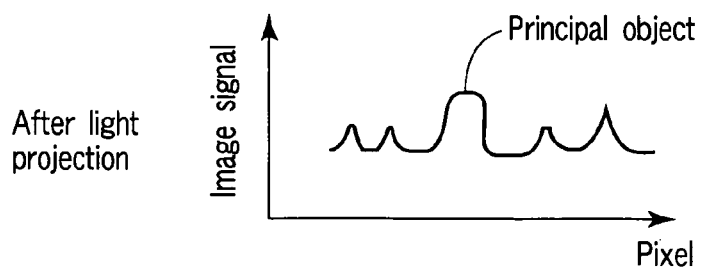
FIG. 14B shows an image signal obtained when light is projected onto an object.

That is, an object distance $L_C$ to the principal object is calculated by the external light AF control, and a distance $L_H$ to the background object is calculated from the image signal of the background object obtained, as shown in FIG. 14A. Furthermore, by calculating the relationship between the distance measuring result and focal point position on the basis of a focal point position $LD_H$ obtained upon executing the imager AF control for the background object, a focal point position $LD_C$ of the principal object can be calculated from this relationship and the object distance $L_C$ of the principal object.

FIG. 15 is a flowchart showing the focus adjustment control sequence of the camera according to the fourth embodiment.

In this flowchart, upon detection of the ON state of the release switch 1a, the CPU 1 makes distance measuring in the external light AF mode without projecting any light toward the object from the light source 11, and calculates an object distance $L_H$ to the background object (step S31). The CPU 1 determines a start point based on the object distance $L_H$ upon starting the imager AF control (step S32), and starts extension of the photographing lens 5 (step S33). The CPU 1 checks if the photographing lens 5 has reached a vicinity of the start point determined in step S32 (step S34). If the photographing lens 5 has not reached the start point yet, the CPU 1 repeats extension of the photographing lens 5 until the photographing lens 5 reaches the start point.

If it is determined in step S34 that the photographing lens 5 has reached the start point, the CPU 1 starts the imager AF control from that start point, and detects a focal point position $LD_H$ of the background object, i.e., a high-contrast object (step S35).

The CPU 1 then controls the light source 11 to project auxiliary light onto the principal object 20, and calculates an object distance $L_C$ to the principal object 20 using the external light AF control in this state (step S36). The CPU 1 calculates a focal point position $LD_C$ of the principal object 20 in accordance with the sequence in step S7 in FIG. 6 above (step S37). In the fourth embodiment, the object distance $L_C$ corresponds to the object distance $L_M$ in the first embodiment.

After the focal point position $LD_C$ of the principal object is calculated, the CPU 1 continues extension of the photographing lens 5. At this time, the CPU 1 checks if the photographing lens 5 has reached the focal point position $LD_C$ (step S38). If it is determined that the photographing lens 5 has not reached the focal point position $LD_C$ yet, the CPU 1 repeats extension of the photographing lens 5 until the photographing lens 5 reaches the focal point position $LD_C$.

On the other hand, if it is determined in step S38 that the photographing lens 5 has reached the focal point position $LD_C$, the CPU 1 stops extension of the photographing lens 5 (step S39), thus ending the focus adjustment control of this flowchart.

Figure 16:
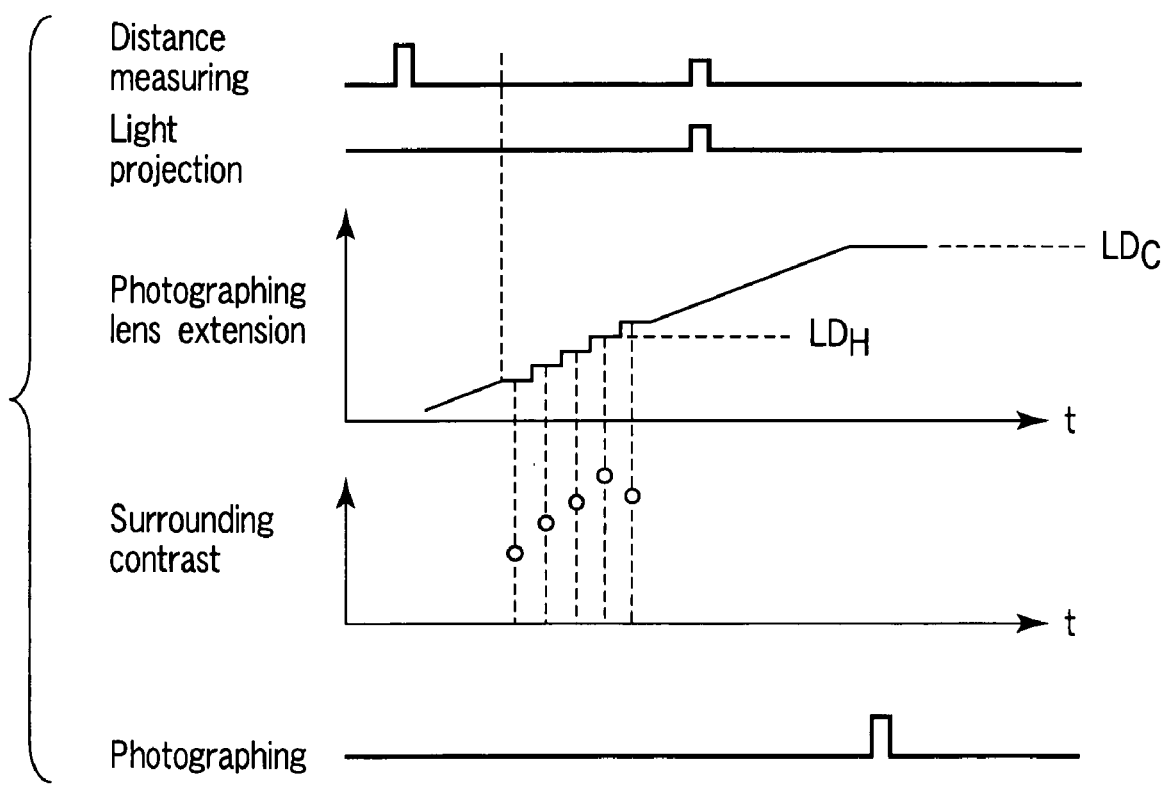
FIG. 16 is a timing chart of the focus adjustment control in the fourth embodiment of the present invention.

FIG. 16 is a timing chart of the focus adjustment control of the fourth embodiment.

Conventionally, the light source must project auxiliary light a large number of times in the imager AF mode. However, in the fourth embodiment, focus adjustment can be attained by projecting auxiliary light only once. For this reason, accurate focus adjustment that can cancel positional errors of the photographing lens even in a night scene can be achieved at high speed while taking energy-saving measures.

Fifth Embodiment

Figure 17:
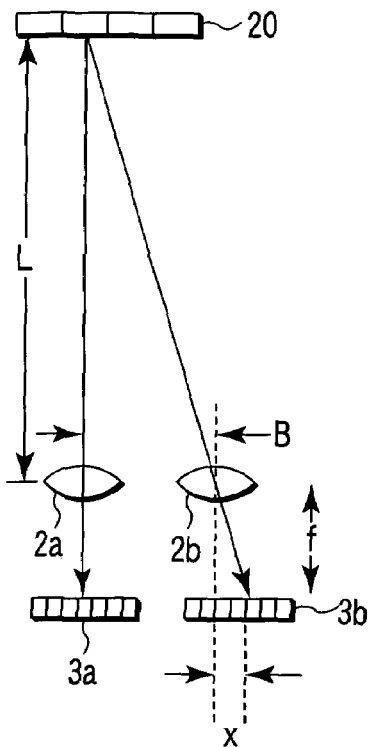
FIG. 17 shows the distance measuring principle of external light AF control in the fifth embodiment of the present invention.

The fifth embodiment of the present invention will be described below. The principle of distance measuring using an external light AF sensor of the fifth embodiment will be described first with reference to FIG. 17. Other arrangements are the same as those in FIG. 1.

An image of the object 20 is formed on the sensor arrays 3a and 3b via the pair of light-receiving lenses 2a and 2b. A relative position difference x between the images formed these sensor arrays changes depending on a parallax B between the pair of light-receiving lenses 2a and 2b, a focal length f of each light-receiving lens, and an object distance L.

More specifically, the image of the object 20 present on the optical axis of one light-receiving lens 2a is formed on the sensor array 3a, and is also formed on the sensor array 3b via the other light-receiving lens 2b at a position separated x from the optical axis of the light-receiving lens 2b. Therefore, by detecting the position difference x between these two images, the object distance L can be calculated. That is, by detecting x in FIG. 17, the object distance L can be calculated using equation (4).

A photographing scene to which the focus adjustment speed-up technique is to be applied in the fifth embodiment will be explained. A photographing scene to which the focus adjustment speed-up technique is to be applied in the fifth embodiment is that shown in, e.g., FIG. 18A. In such a scene, the photographer is about to take a picture with a composition including a building 20c and person 20a, as shown in FIG. 18A.

Figures 18A, 18B, 18C:
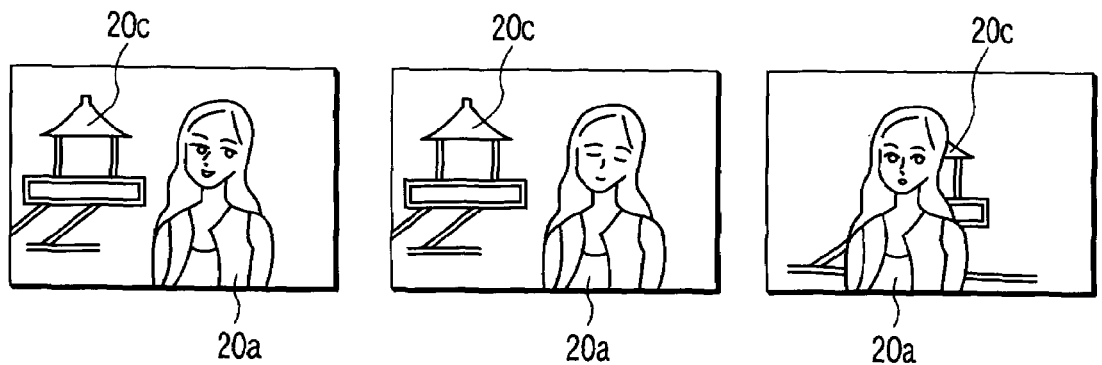
FIGS. 18A to 18C are views for explaining photographing scenes assumed in the fifth embodiment of the present invention.

In the composition shown in FIG. 18A, the photographer can release the shutter when, for example, the person 20a makes a good facial expression, e.g., smiles. However, when focus adjustment is made using the imager AF control that detects the focal point position by detecting a maximum contrast point while moving the photographing lens 5, the photographer cannot take a picture of such a good facial expression due to a time lag in the focus adjustment, and may release the shutter when the object closes the eyes, as shown in FIG. 18B. Even when the photographer releases the shutter again, he or she may take a picture of a bad facial expression again due to a time lag in the focus adjustment.

When the photographer releases the shutter in a hurry to catch a good facial expression of the person 20a, the building 20c as a background may be hidden behind the person 20a, as shown in FIG. 18C, and a picture in which the person 20a appears with a good facial expression but which has a bad composition may be taken. In such a situation, the photographer wants to change only the composition while the current appearance, facial expression, and the like of the person 20a remain the same. However, since the focus adjustment is redone after the composition is changed from that in FIG. 18A, the facial expression of the person 20a may not be good upon releasing the shutter.

In such a situation, the photographer releases the shutter again since he or she is satisfied with a focus, but is not satisfied with the composition or the facial expression of the person upon photographing. Hence, it is wasteful to repeat focus adjustment using the imager AF mode that requires a long focus adjustment time in such a case. However, when focus adjustment is made using only the external light AF mode, position errors of the photographing lens 5 upon focus adjustment cannot be canceled.

Figure 19:
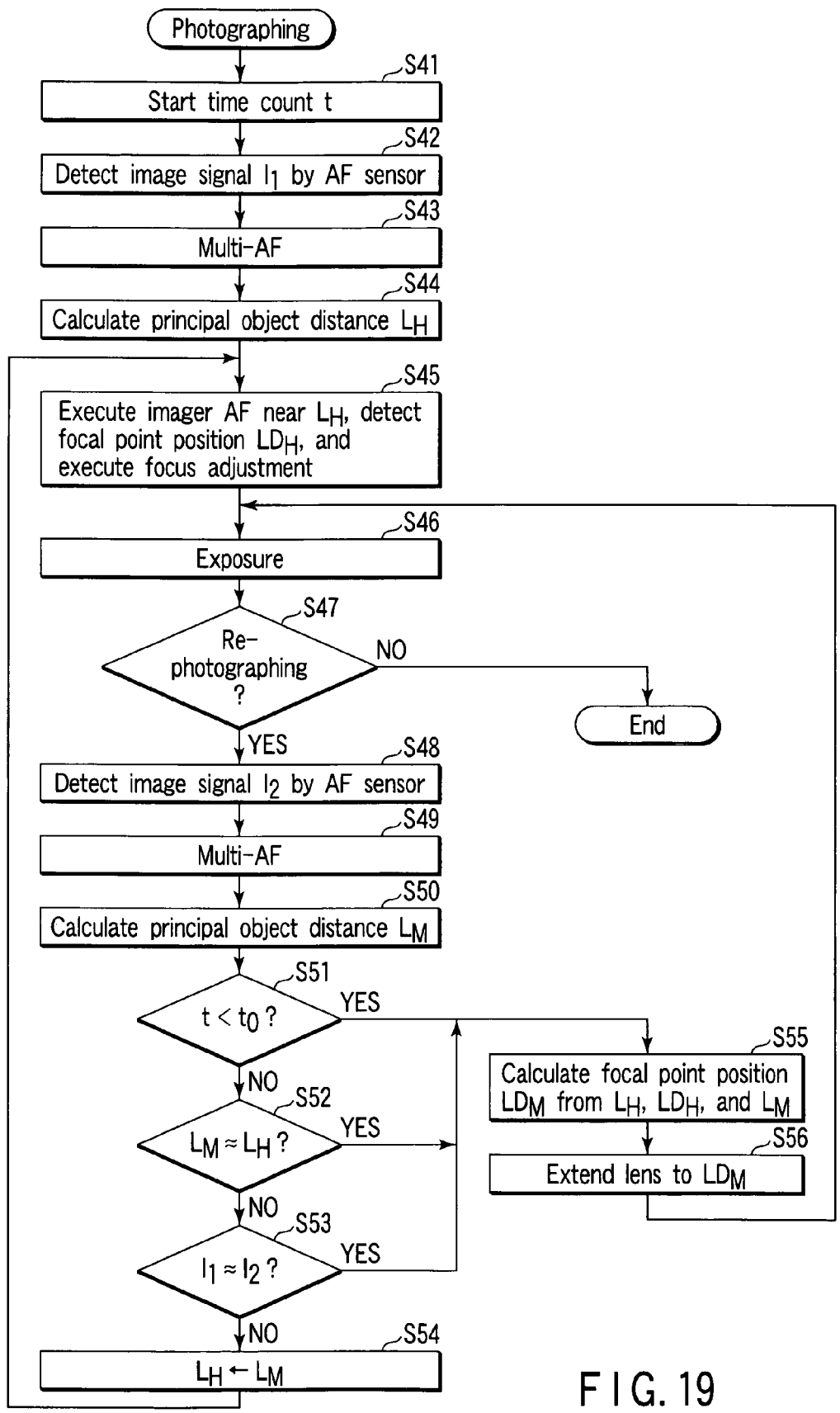
FIG. 19 is a flowchart of photographing control in the fifth embodiment of the present invention.

Hence, the fifth embodiment executes the photographing control according to the flowchart of FIG. 19, and executes the second and subsequent focus adjustment processes using only the external light AF mode without any imager AF control, when a predetermined condition that can prevent errors from being enhanced using only the external light AF mode is satisfied.

In this flowchart, upon detection of a photographing start instruction from the photographer, i.e., the ON state of the release switch 1a, the CPU 1 starts counting of a timer (not shown) (step S41). This is to measure a time elapsed after the first focus adjustment. The CPU 1 calculates an object distance using the external light AF mode. For this purpose, the CPU 1 detects an image signal 11 formed on the sensor arrays 3a and 3b (step S42). The CPU 1 measures distances to a plurality of points in the photographing frame using the detected image signal 11 (step S43) to obtain the aforementioned distance distribution.

The CPU 1 obtains a distance $L_H$ to a principal object from the distance distribution obtained in step S43 (step S44). In this case, the CPU 1 obtains the distance $L_H$ to the principal object by selecting the nearest distance from the obtained distance distribution. The CPU 1 then detects a focal point position $LD_H$ by executing the imager AF control using the output from the image sensing element 7, which corresponds to a point that indicates the obtained distance $L_H$, and controls the photographing lens 5 to extend to that focal point position $LD_H$ (step S45). After that, the CPU 1 executes an exposure operation for recording an object image on the recording medium 10 (step S46).

The photographer checks the photographing result obtained at that time to see if the photographing result that he or she intended is obtained, and does re-photographing as needed. The CPU 1 checks if a photographer's re-photographing instruction is received (step S47). This checking process can be attained by examining if the release switch 1a is turned on again.

If it is determined in step S47 that no re-photographing instruction is received, the photographing control in this flowchart ends. At this time, the CPU 1 resets the count of the timer that started in step S1 to "0". Note that the timer count may be reset upon starting up the camera.

The CPU 1 may not check if the re-photographing instruction is received. In a such case, the camera is designed to allow the photographer confirm an image before exposure using an electronic viewfinder or the like, and to issue a re-focus adjustment instruction to the camera after confirmation. As the arrangement in this case, a switch operated by the release button 1b shown in FIG. 2B comprises two-stroke switches, i.e., 1st and 2nd release switches. With this arrangement, when the release button 1b is pressed to its first-stroke position, the 1st release switch is turned on to execute distance measuring and focus adjustment operations; when the release button 1b is further pressed, the 2nd release switch is turned on to execute an exposure operation. That is, when the 1st release switch is turned on, the photographer can change the current composition, and can execute focus adjustment again with the changed composition.

If it is determined in step S47 that the re-photographing instruction is received, the CPU 1 detects an image signal $I_2$ by the external light AF control (step S48), executes multi-AF control based on the detected image signal $I_2$ (step S49), and then calculates a distance $L_M$ to the principal object (step S50).

As described above, the photographer is not always dissatisfied with only focus when he or she does re-photographing. It is waste of time to repeat focus adjustment in the imager AF mode in such case. When the release time lag is prolonged, the aforementioned problem of a change in facial expression and the like occurs. Hence, in the fifth embodiment, when one of the following conditions is satisfied, i.e., when an elapsed time after the previous photographing operation is not so long, when the moving distance of the object is not so large, or when a change in image signal of the object is not so large, re-photographing is done using the external light AF mode without imager AF.

That is, the CPU 1 checks if a count value t of the aforementioned timer has reached a predetermined time to (e.g., about 1 min) (step S51). If it is determined in step S51 that the count value t of the timer has reached the predetermined time to, the CPU 1 checks if a large difference has been generated between the distances $L_M$ and $L_H$ (step S52). If it is determined that a large difference has been generated between the distances $L_M$ and $L_H$, the CPU 1 checks if a large difference has taken place between the image signals $I_1$ and $I_2$ (step S53). If it is determined that a large change has taken place between the image signals $I_1$ and $I_2$, the CPU 1 determines the distance $L_M$ as a distance to the principal object (step S54). The flow returns to step S45 to execute the focus adjustment control by starting imager AF.

If it is determined in step S51 that the count value t of the timer has not reached the predetermined time $t_0$, if it is determined in step S52 that a large difference has not been generated between the distances $L_M$ and $L_H$, or if it is determined in step S53 that a large difference has not taken place between the image signals $I_1$ and $I_2$, the CPU 1 calculates a new focal point position $LD_M$ on the basis of the distance $L_H$, focal point position $LD_H$, and distance $L_M$ (step S55). The calculation method of this focal point position $L_{DM}$ will be described later.

After the focal point position $LD_M$ is calculated in step S55, the CPU 1 controls the photographing lens 5 to extend to this focal point position $LD_M$ (step S56). Then, the flow returns to step S46 to execute the exposure operation.

For example, since the difference between image signals of FIGS. 18A and 18B is whether or not the eyes of the person in FIG. 18A are closed, the image signal does not so change even when the state in FIG. 18A has changed to that in FIG. 18B. In this case, the focal point position can be calculated by the method in step S55 without imager AF upon re-photographing. In the example shown in FIG. 18C, the composition of the background has changed, but the object distances changes little between FIGS. 18C and 18A. In this case as well, the focal point position is calculated using the method in step S55 without imager AF.

Note that an extension error of the photographing lens 5, which is produced due to changes in environment or the like is canceled in step S55 on the basis of the relationship between the object distance and focal point position obtained in steps S44 and S45. Arithmetic operations carried out in step S55 will be explained below.

Figure 20:
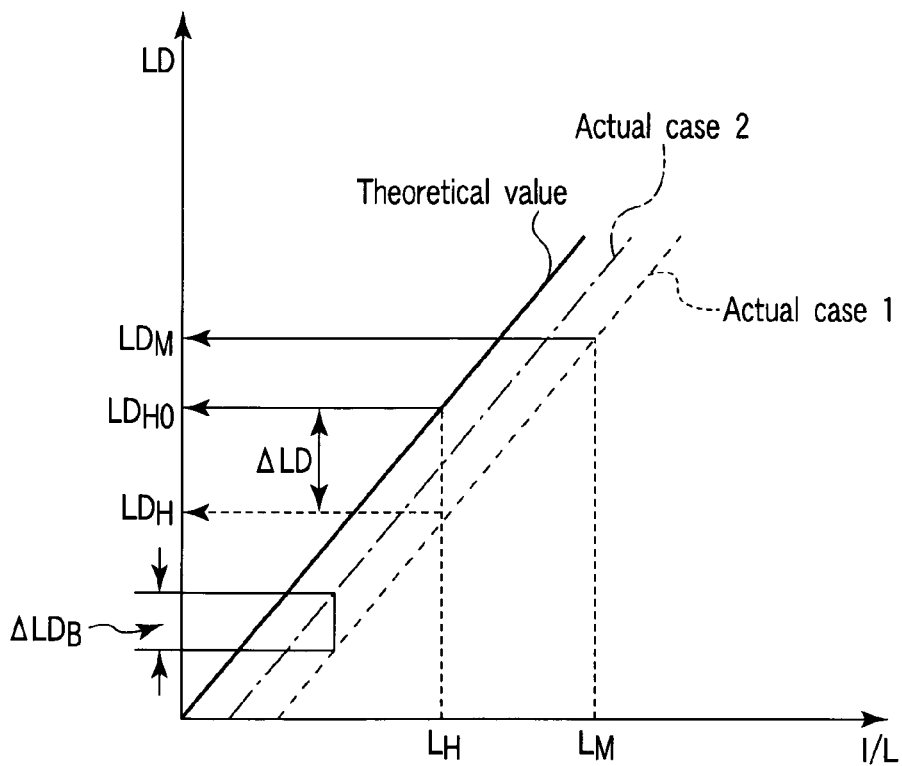
FIG. 20 is an explanatory view associated with a focal point position calculation method.

In general, the reciprocal 1/L of an object distance L, and focal point position LD have a linear relationship, as indicated by the solid line in FIG. 20. This relationship is given by:

$$LD = C \times 1/L + D \quad (5)$$

where C and D are constants. This relationship is pre-stored in a RAM (not shown) of the CPU 1 or the like.

Note that this relationship may have errors due to changes in temperature, humidity, and the like, depending on the posture upon photographing, and the like. A relationship including such errors is indicated by the broken line "actual case 1" in FIG. 20.

In the fifth embodiment, the focal point position $LD_H$ at the distance $L_H$ detected in step S44 is obtained from the output of the image sensing element 7, and a difference $\Delta LD$ between this $LD_H$ and a theoretical value $LD_{H0}$ at the distance $L_H$ is calculated by:

$$\Delta LD = LD_H - LD_{H0} \quad (6)$$

Upon focus adjustment to a point that outputs another distance measuring result $L_M$, a correct focal point position $LD_M$ is calculated using:

$$LD_M = C \times 1/L_M + D + \Delta LD \quad (7)$$

in consideration of $\Delta LD$ given by equation (6). The CPU 1 controls the photographing lens 5 to extend on the basis of this focal point position $LD_M$.

FIGS. 21A, 21B, and 21C are timing charts upon focus adjustment. FIG. 21A is a timing chart when the imager AF control is done for every focus adjustment, FIG. 21B is a timing chart when the focus adjustment speed-up technique in the fifth embodiment is applied, and FIG. 21C is a timing chart when the photographing lens 5 is returned to a previous position upon completion of photographing.

In the method shown in FIG. 21A, extension of the photographing lens 5 starts from an infinity (∞) position in accordance with the distance measuring result. Note that numerals 1 to 5 shown in FIG. 21A indicate that contrast detection is made at these five focal point positions. Note that the five positions are not limited to their illustrated positions in FIG. 21A. Also, contrast detection may be made at positions more than five positions. Upon second distance measuring after this contrast detection, contrast detection is made again at five photographing lens positions.

In the example in FIG. 21A, the position of the photographing lens 5 is not reset after first distance measuring, and the focal point position of the photographing lens 5 is directly adjusted from the position after first distance measuring to the start position of the second imager AF control. By contrast, in the example of FIG. 21C, a longer focus adjustment time than in FIG. 21A is required, since the position of the photographing lens 5 is reset after exposure.

In the example of FIG. 21B, since the second focal point position is calculated from the first focus adjustment result, the second focus adjustment does not require imager AF control. For this reason, the time required for the second focus adjustment is only that required for the external light AF control, i.e., $\Delta t_0$. That is, the focus adjustment time can be shortened by $\Delta t_1$ compared to the example of FIG. 21A, and by $\Delta t_2$ compared to the example of FIG. 21C.

When the photographing lens 5 is displaced from an extension direction to a retraction direction like in a case wherein the photographing lens 5 is displaced from focal point position 4 to focal point position 5 in FIG. 21B, a defocus between extension and retraction due to relative movement of mechanical parts caused by the slack in coupling among mechanical parts in the LD unit 6 must be taken into consideration. Such relative movement of mechanical parts is called backlash. In consideration of such backlash, the relationship between the reciprocal 1/L of the object distance and the focal point position LD changes to "actual case 2" indicated by the single-dashed chain line in FIG. 20.

That is, if an error due to backlash assumes a predetermined value $\Delta LD_B$, the focal point position $LD_M$ is determined using:

$$LD_M = C \times 1/L_M + D + \Delta LD - \Delta LD_B \quad (8)$$

Then, the photographing lens 5 can be controlled to retract to this focal point position $LD_M$. The second focus adjustment shown in FIG. 21B is preferably done to a position that takes account of this $\Delta LD_B$.

When the second distance measuring result indicates a near distance and no retraction operation of the photographing lens 5 is required, since the influence of backlash need not be taken into consideration, the focal point position $LD_M$ can be calculated using equation (7).

Figure 22:
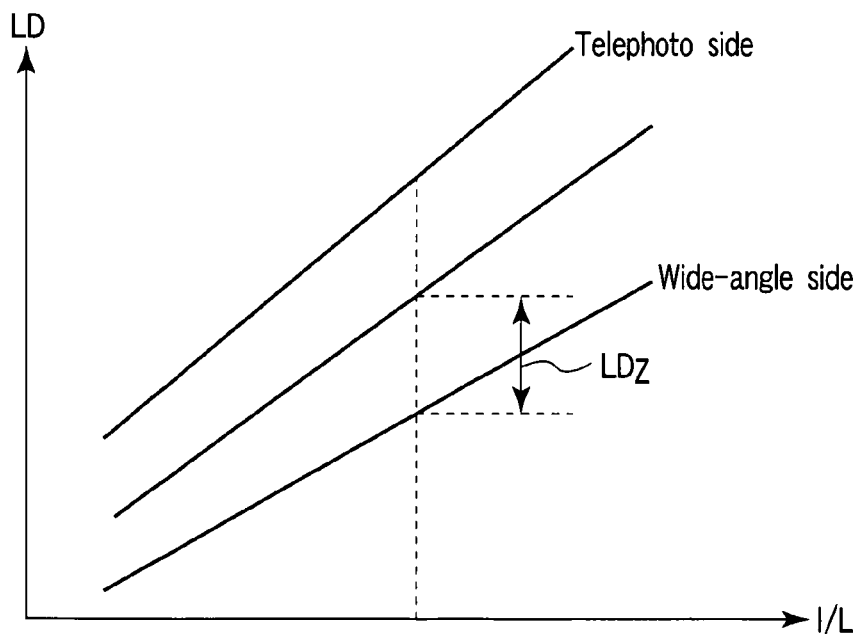
FIG. 22 is a graph showing the relationship between the object distance and focal point position in a zoom lens.

Furthermore, when the photographing lens 5 is a rear-focus type zoom lens, the focal point position shifts, as shown in FIG. 22, as a result of zooming. That is, when zooming is made toward the telephoto side, the focal point position shifts to the far distance side; when zooming is made toward the wide-angle side, the focal point position shifts to the near distance side. Therefore, when the photographing lens 5 is a zoom lens, shift of the focal point position upon zooming is preferably taken into consideration.

Figure 23:
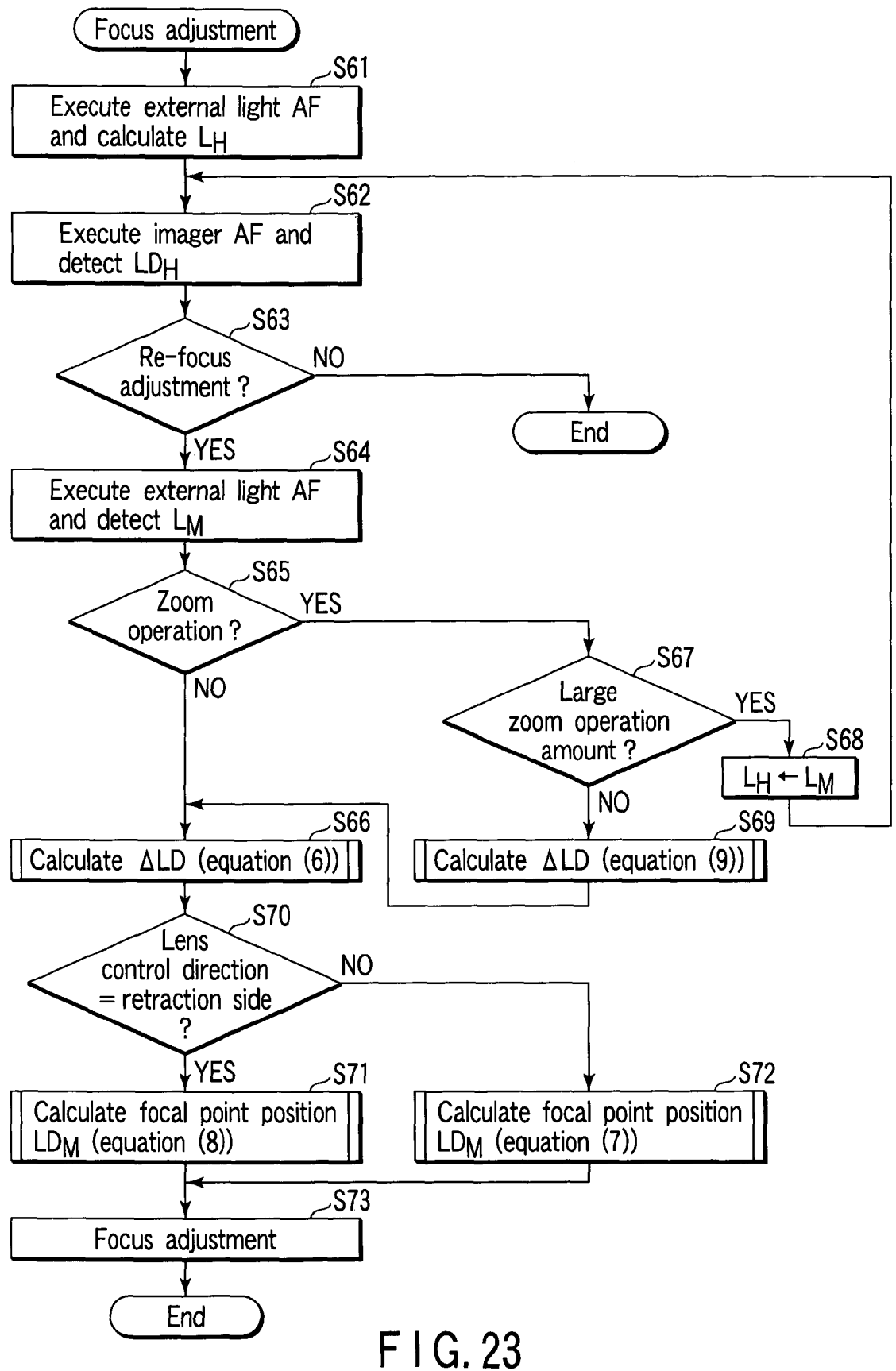
FIG. 23 is a flowchart of focus adjustment control when a photographing lens is a zoom lens.

FIG. 23 is a flowchart showing the focus adjustment control sequence when the photographing lens 5 is a zoom lens. In this flowchart, correction of errors due to backlash will also be explained together.

In this flowchart, upon detection of a photographing start instruction from the photographer, i.e., the ON state of the release switch 1a, the CPU 1 executes distance measuring based on the external light AF scheme to calculate an object distance $L_H$ to a principal object (step S61). The CPU 1 executes the imager AF control at a point that outputs the object distance $L_H$ to detect a focal point position $LD_H$ (step S62).

At this time, the photographer observes an image displayed on, e.g., an electronic viewfinder to see if the composition and focus that he or she intended are obtained. Then, the photographer makes re-focus adjustment as needed. The CPU 1 then checks if a photographer's re-focus adjustment instruction is received (step S63). If it is determined that no re-focus adjustment instruction is received, the focus adjustment control of this flowchart ends.

On the other hand, if it is determined in step S63 that the photographer's re-focus adjustment instruction is received, the CPU 1 executes the external light AF control again to calculate an object distance $L_M$ (step S64). The CPU 1 checks if the photographer has made a zooming operation (step S65). If it is determined that the photographer has not made a zooming operation, the CPU 1 calculates $\Delta LD$ using equation (6) (step S66), and the flow then advances to step S70.

On the other hand, if it is determined in step S65 that the photographer has made a zooming operation, the CPU 1 checks if the zooming operation amount at that time is larger than a predetermined amount (step S67). If it is determined in this step that the zooming operation amount is larger than the predetermined amount, the shift amount of the focal point position due to zooming is too large, and correction using a fixed value degrades the reliability of the focus adjustment control. Hence, in such case, after the CPU 1 sets the second distance measuring result $L_M$ as new $L_H$ (step S68), the flow returns to step S22 to execute the imager AF control. On the other hand, if it is determined in step S67 that the zooming operation amount is equal to or smaller than the predetermined amount, $\Delta LD$ is determined using:

$$\Delta LD = LD_H - LD_{H0} + LD_Z \quad (9)$$

in consideration of a defocus $LD_Z$ of the focal point position due to zooming shown in FIG. 22 (step S69), and the flow then advances to step S70.

After $\Delta LD$ is determined using equation (6) or (9), the CPU 1 checks if the control direction of the photographing lens 5 is the retraction side, i.e., the CPU 1 compares the second and first distance measuring results $L_M$ and $L_H$ to see if $L_M > L_H$ (step S70). If it is determined in step S70 that $L_M > L_H$, the CPU 1 controls the photographing lens 5 to retract. In such a case, since an error due to backlash may be generated, the CPU 1 calculates the focal point position $LD_M$ using equation (8) (step S71), and the flow advances to step S73.

On the other hand, if it is determined in step S70 that $L_M \leq L_H$, the photographing lens 5 need not be displaced or is controlled to extend. In such a case, the CPU 1 calculates the focal point position $LD_M$ using equation (7) (step S72), and the flow advances to step S73.

After the focal point position $LD_M$ is calculated, the CPU 1 adjusts a focus of the photographing lens 5 to that position (step S73), and the focus adjustment control in this flowchart ends.

As described above, according to the fifth embodiment, high-speed focus adjustment control can be made by effectively using the external light and imager AF schemes in consideration of an error due to backlash upon focus adjustment control of the photographing lens and a focal point position shift when the photographing lens is a zoom lens.

Sixth Embodiment

The sixth embodiment of the present invention will be described below. The sixth embodiment photographs a moving object by utilizing the feature of the focus adjustment speed-up technique described in the fifth embodiment.

Upon photographing an object who is running from the position shown in FIG. 24A to that shown in FIG. 24B, the photographer initially holds the camera to have a composition shown in FIG. 24A. After that, the photographer starts photographing when a person 20 as a principal object appears with a size that he or she wants, as shown in FIG. 24B. For example, such photographing scheme is used when the photographer wants to photograph, e.g., an instance when a child crosses the finish line in a school athletic meeting.

However, in such photographing, the person 20 is moving. For this reason, in the imager AF mode that requires a long focus adjustment time, the person 20 may have moved from a position that the photographer wants during focus adjustment. This may disturb photographing with a composition of photographer's choice. The sixth embodiment allows photographing in such situation.

FIG. 25 is a flowchart showing the control sequence upon photographing a moving object of a camera according to the sixth embodiment. Note that the camera according to the sixth embodiment has a mode switch (not shown) which is used to set the camera in a mode for moving object photographing.

As for other arrangements, since the same arrangements as those in the fifth embodiment can be applied, a description thereof will be omitted.

If the camera mode is set in the moving object photographing mode, the CPU 1 measures a distance to a high-contrast object (e.g., a tree or the like) in a background using the external light AF mode. The CPU 1 then calculates an object distance $L_H$ to that object (step S81). The CPU 1 executes the imager AF control at a point that outputs the object distance $L_H$ detected in step S81, and detects a focal point position $LD_H$ (step S82).

The CPU 1 checks if the release switch 1a is turned on (step S83). When the photographer confirms a composition and is satisfied with that composition, he or she presses the release button 1b to turn on the release switch 1a. If it is determined in step S83 that the release switch 1a is not ON, the CPU 1 checks the state of the mode switch to see if the moving object photographing mode is canceled (step S84). If it is determined that the moving object photographing mode is canceled, the moving object photographing control in this flowchart ends. On the other hand, if it is determined in step S84 that the moving object photographing mode is not canceled, the flow returns to step S81. That is, the external light AF control and imager AF control are repeated for a background object unless the moving object photographing mode is canceled.

If it is determined in step S83 that the release switch 1a is ON, the CPU 1 executes the external light AF control for a person 20 as a principal object and calculates an object distance $L_R$ (step S85). The CPU 1 then calculates a focal point position $LD_R$ on the basis of the relationship among $L_H$, $LD_H$, and $LD_R$ (step S86). Note that the calculation method of this $LD_R$ will be described later. In this case, since the imager AF control is skipped, high-speed focus adjustment can be achieved.

Figure 26:
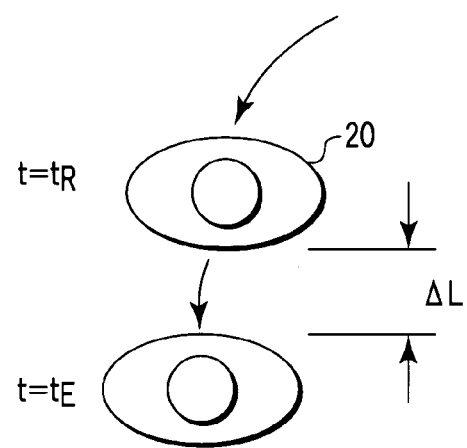
FIG. 26 is an explanatory view of a time lag from when a release switch is turned on until exposure control starts actually.

The CPU 1 then corrects the focal point position in consideration of the movement of the person 20, as shown in FIG. 26, i.e., a moving amount $\Delta L$ of the person 20 between an ON timing $t_R$ Of the release switch 1a, and actual exposure timing $t_E$ (step S87). Note that the moving amount $\Delta L$ is a predetermined value calculated by multiplying an average walking or running speed of a person by a time $(t_E-t_R)$ from when the release switch 1a is turned on until exposure is made, for the sake of simplicity. This value is calculated based on prediction that a change in speed is not so large between the ON timing of the release switch and exposure timing. Of course, the moving speed of the object 20 may be detected, and $\Delta L$ may be calculated from the detected speed.

After the focal point position is corrected using the moving amount $\Delta L$, the CPU 1 adjusts the photographing lens 5 to the corrected focal point position, and makes exposure (step S88).

The method of calculating the focal point position $LD_R$ in step S86 will be described below.

Figure 27:
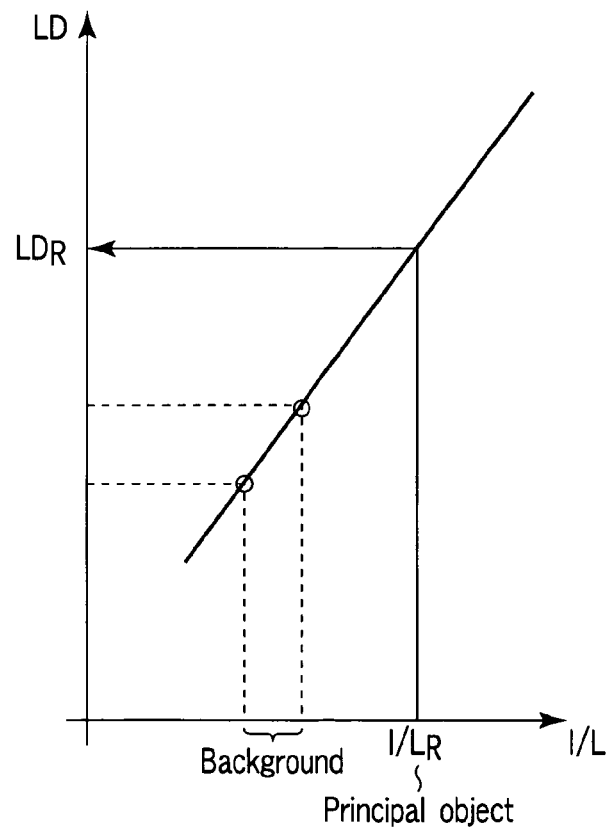
FIG. 27 is a graph showing the relationship between the object position and focal point position.

As described above, the external light AF control and imager AF control are repeated for a background object at given time intervals unless the moving object photographing mode is canceled. When the visual axis direction of the camera has changed during this interval, the external light AF control and imager AF control are made for, e.g., a tree, house, and the like as background objects after the person 20 as a principal object. In this way, focal point positions for a plurality of distances can be obtained, as shown in FIG. 27. The relationship shown in FIG. 27 corresponds to that given by equation (5) as the relationship of the theoretical value, and also contains an error from the theoretical value. That is, if the object distance $L_R$ is calculated by executing the external light AF control in step S85, the focal point position $LD_R$ can be calculated, from the relationship in FIG. 27, by:

$$LD_R = C' \times 1/L_R + D' \qquad (6)$$

where C' and D' are constants, which can be obtained from the relationship shown in FIG. 27.

As described above, according to the sixth embodiment, quick and accurate focus adjustment can be achieved even in the moving object photographing mode.

Figure 28:
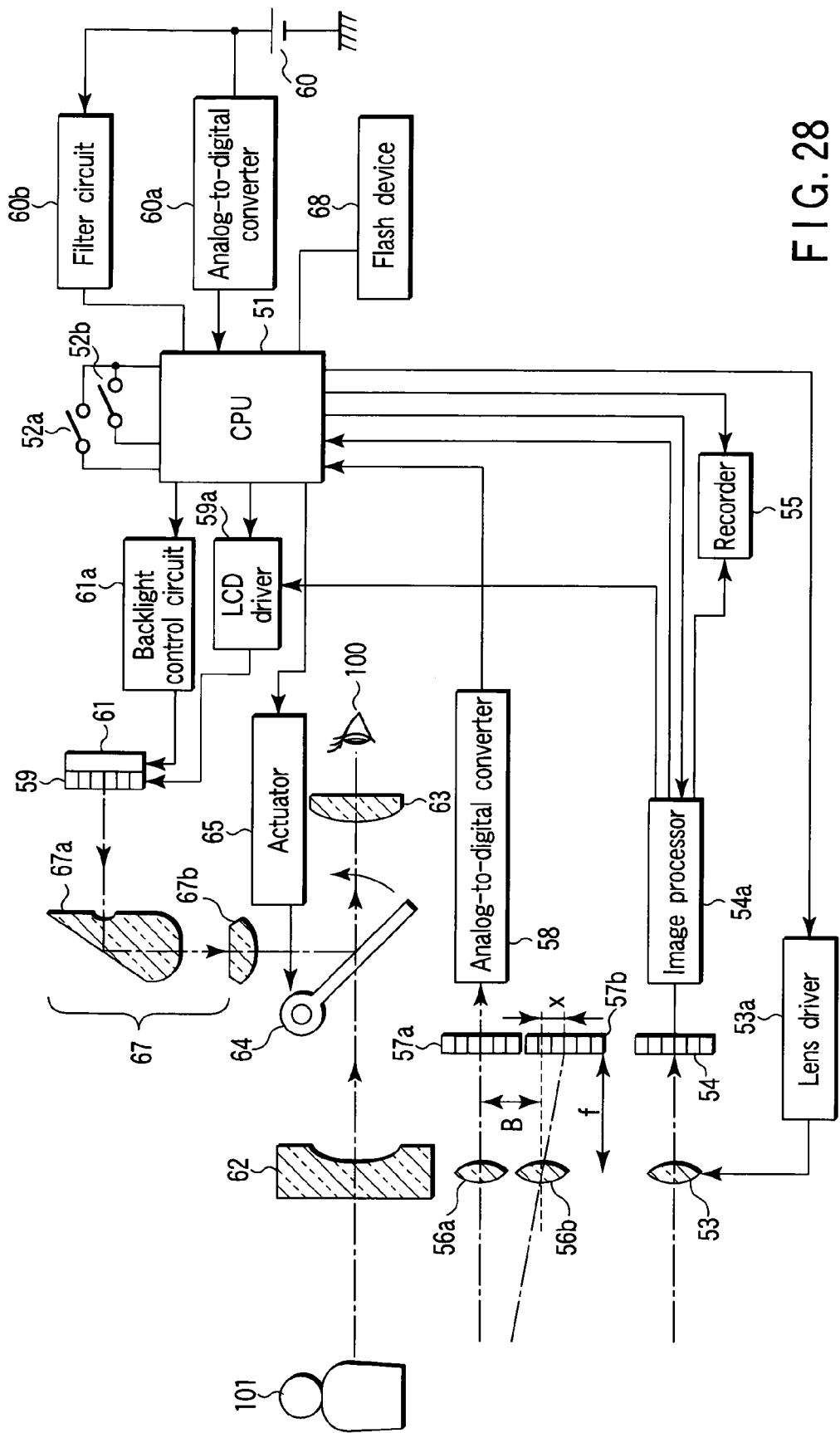
FIG. 28 is a block diagram showing the arrangement of a camera as a modification of an image sensing apparatus according to an embodiment of the present invention.
Figure 29A:
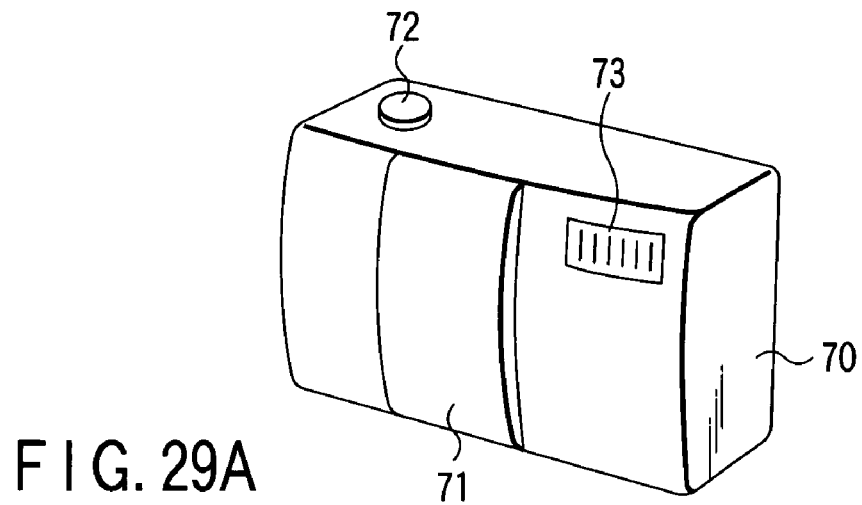
FIG. 29A is a front perspective view of the camera with its barrier closed.
Figure 29B:
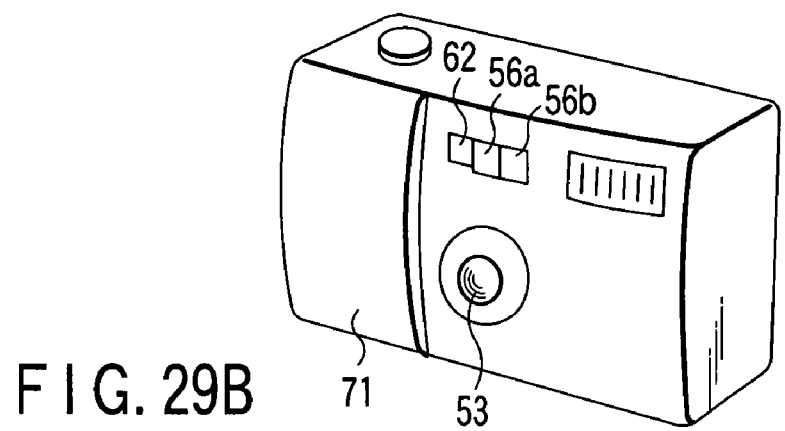
FIG. 29B is a front perspective view of the camera with its barrier opened.
Figure 29C:
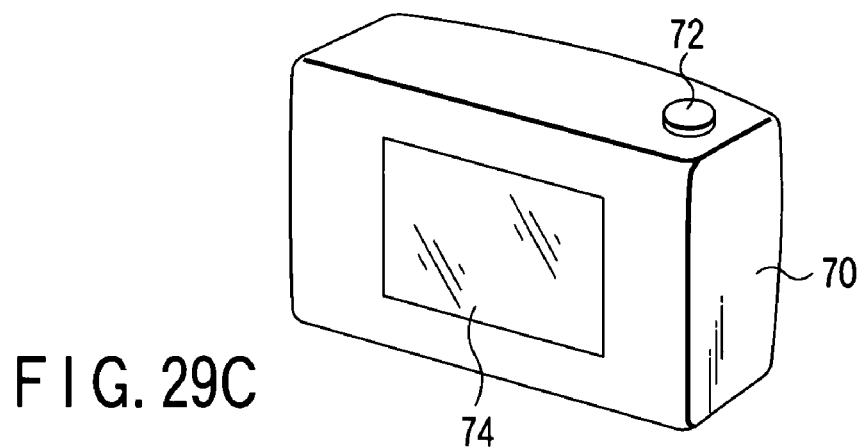
FIG. 29C is a rear perspective view of the camera.

Another example of an image sensing apparatus to which the techniques explained in the respective embodiments of the present invention can be applied will be described below with reference to FIGS. 28 to 33. FIG. 28 is a block diagram showing an example of the arrangement of a camera as an example of the image sensing apparatus, and FIGS. 29A to 29C are perspective views showing the outer appearance of this image sensing apparatus.

As shown in FIG. 28, an objective lens 62 for a viewfinder and an eyepiece lens 63 are coaxially arranged on this camera main body. A movable mirror 64 is pivotally inserted between these lenses. The movable mirror 64 is driven by an actuator 65 to switch light that has entered via the objective lens 62 to a second optical path.

A CPU 51 which systematically controls this camera operates upon receiving power supply via an analog-to-digital converter 60a. This CPU 51 controls to drive the actuator 65, and controls execution of a series of photographing sequences in response to a release operation for release switches 52a and 52b, which form a two-stroke switch structure.

The CPU 51 is connected to an image processor 54a, recorder 55, analog-to-digital converter 58, LCD driver 59a, and backlight control circuit 61a, as shown in FIG. 28, and is designed to execute known basic control as a digital camera (electronic camera). In addition, the CPU 51 is connected to a flash device 68 which serves as an auxiliary light source, and to a battery 60 via the analog-to-digital converter 60a and a filter circuit 60*b*. The CPU 51 appropriately controls the respective units of the camera under stable power supply via the filter circuit 60*b* that suppresses voltage variations of the battery 60.

In this camera, when an optical viewfinder (OVF) is used, since the movable mirror 64 is retracted from the optical path that couples the lenses 62 and 63 by the driving force of the actuator 65, an OVF function is effected. Hence, a photographer 100 as a user can optically observe an object 101 without the intervention of any electrical processes of the camera. At this time, since an object image observation system requires zero current consumption from the battery 60, the photographer 100 can determine a composition without haste.

On the other hand, when an electronic viewfinder (EVF) is used, the following merits which cannot be obtained by the OVF are expected. This EVF system is as follows. In this system, image data photoelectrically converted by an image sensing element 54 via a photographing lens 53 undergoes image processing in the image processor 64*a*. Furthermore, an object image, which is electronically displayed on an LCD 59 driven by the LCD driver 59*a*, is illuminated from behind the LCD 59 with light emitted by the backlight 61. This object image is reflected by the movable mirror 64 via an enlargement optical system 67 which comprises a prism 67*a* and lens 67*b*, and the photographer 100 observes this image via the eyepiece lens 63.

More specifically, since an image obtained via the photographing lens 53 can be directly displayed on the viewfinder, the photographer 100 can visually observe basically the same image as that which is photoelectrically converted by the image sensing element 54 and recorded in the recorder 55 immediately before photographing. For this reason, for a near-distance object or the like, an image free from any parallax can be obtained. However, as demerits of the EVF, not only large current consumption is required, but also an object with a large luminance difference is hard to observe. Also, as other demerits of the EVF, digital processes (capture, readout, and display processes) of an image take much time, and the EVF is not suited to observation of a moving object.

Hence, when the object 101 is, e.g., a moving object, this camera is appropriately controlled not to apply the EVF. That is, as shown in FIG. 28, the position of the movable mirror 64 is controlled by the actuator 65 (to be retracted from the optical path in this case), which is driven in accordance with a command from the CPU 51. As a result, the OVF can be used in place of the EVF. Also, such control is made when power consumption is to be suppressed.

The CPU 51 as a microprocessor is set to launch a resident control program simultaneously switch power ON (power switch ON). The CPU 51 checks the states of the release switches 52*a* and 52*b* connected to it, and detects a release operation by the photographer 100. When the electronic viewfinder (EVF) is used, the CPU 51 appropriately controls the image processor 54*a*, LCD driver 59*a*, backlight control circuit 61*a*, and the like.

The CPU 51 detects images obtained via two lenses 56*a* and 56*b* having the parallax using sensor arrays 57*a* and 57*b*, and the analog-to-digital converter 58, and calculates an object distance on the basis of the known principle of triangulation. The CPU 51 controls a lens driver 53*a* based on this calculation result to execute focus adjustment control of the photographing lens 53. In addition, the CPU 51 controls the flash device 68 to emit light as needed upon photographing, and also executes control upon recording image data compressed by the image processor 54*a* in the recorder 55.

These electronic circuits receive energy based on currents supplied from the battery 60. When the flash device 68 or the like operates, especially large currents are intermittently consumed. Hence, the filter circuit 60*b* suppresses variations of a power supply voltage. A battery voltage is converted into a digital signal via the analog-to-digital converter 60*a*. With this digital signal, the CPU 51 can detect the degree of consumption of the battery 60.

Of the views that show the outer appearance of such camera, FIG. 29A shows the state wherein a lens barrier 71 for lens projection of the camera is closed, and FIG. 29B shows the state wherein the lens barrier 71 is opened. This lens barrier 71 also serves as a power switch of the camera. That is, the power supply starts in cooperation with the open/close operation of the lens barrier 71, and the CPU 51 launches the predetermined control program. A release button 72, which interlocks with the built-in, two-stroke type release switches 52*a* and 52*b*, projects from the upper surface of a camera main body 70. On the front surface of the camera main body 70, the photographing lens 53, the aforementioned viewfinder objective lens 62, the pair of light-receiving lenses 56*a* and 56*b* for distance measuring (AF), a light-emitting unit 73 of the flash device 68, and the like are arranged.

Note that the structure of the camera may be modified as follows. For example, an electronic monitor 74 which comprises a liquid crystal display (LCD) or the like may be arranged on the back surface of the camera main body 70 to be directly seen, as shown in FIG. 29C that shows the outer appearance, in place of the system that switches two optical paths by the movable mirror 64. Of course, the need for the optical path switching mechanism (e.g., the movable mirror 64 and actuator 65) can be obviated in such a case.

Software control in such camera will be described below. When the lens barrier 71 is closed, as described above, the CPU 51 turns off the electronic monitor 74 to reduce its consumption energy. On the other hand, when the lens barrier 71 is opened, the CPU 51 switches the screen display contents under appropriate control in accordance with a sequence prescribed based on the control program, which is shown in the flowchart of FIG. 30. A camera sequence as a main routine of this camera is known to those who are skilled in the art, and a display process routine shown in FIG. 30 is a subroutine called from this main routine.

In the display process, the CPU 51 checks if the current photographing environment of this camera meets a predetermined condition (step S91). If the predetermined condition is met, a display is made using the electronic viewfinder (EVF) (step S92); otherwise, a display is made using the optical viewfinder (OVF) (step S93). Of course, the photographer may manually turn off the display to disable the EVF on the basis of his or her favor or judgement of the situation.

When the movable mirror 64 is inserted between the viewfinder objective lens 62 and eyepiece lens 63, as shown in FIG. 28, the electronic viewfinder (EVF) display is made; when the movable mirror 64 is retracted from the optical path, the optical viewfinder (OVF) display is made. The CPU 51 controls to turn on the LCD panel 59 in the EVF display mode, and to turn off the LCD panel 59 in the OVF display mode.

Whether or not the display mode is switched is determined based on the predetermined condition in step S91 every time a predetermined period of time elapses in step S94. Therefore, the photographer need only hold this camera, and the CPU 51 in the camera selects a viewfinder display mode most suited to the current photographing scene. Hence, the user need not make any complicated operations such as a switching operation of the viewfinder device unlike in conventional cameras, and can concentrate on photographing while observing an object image displayed on the viewfinder. If it is determined in step S94 that the predetermined period of time has not elapsed yet, it is checked in step S95 if a display OFF operation is made. If it is determined that the display OFF operation is made, the CPU 51 turns off the display screen and controls to select the optical viewfinder (OVF) in step S96 to also take energy-saving measures.

As an example of the predetermined condition in step S91 in the flowchart of FIG. 30, a photographing scene with a large contrast difference, as shown in FIG. 31, is expected in practice. In such a scene, when the display mode is set while adjusting the exposure level to the person 101 as a principal object, the background often suffers highlight saturation and disappears, as shown in, e.g., FIG. 32B, due to limits on the specification of a display circuit (LCD driver 59a, backlight control circuit 61a, and the like) associated with the EVF in the EVF display mode. On the other hand, when the display mode is set to allow to observe the background, the person is overexposed in turn to hide her facial expression, as shown in FIG. 32A. These are the demerits of the EVF. Hence, in such a photographing scene, since it is preferable to apply the optical viewfinder, the display mode is switched to the OVF.

As described above, since the optical viewfinder can provide a so-called energy saving effect, and is good for a moving object (i.e., a natural, smooth display can be made), another display process control shown in the flowchart of FIG. 33 is available. The processing sequence will be described below with reference to this flowchart. The CPU 51 checks in step S101 if the lens barrier 71 provided to the front surface of the camera is opened. That is, the CPU 51 waits until the lens barrier 71 is opened. If the lens barrier 71 is opened, the CPU 51 starts checking of the predetermined condition shown in, e.g., FIG. 30. The CPU 51 controls the distance measuring sensors (AF sensors 57a and 57b) to detect image signals (step S102). In step S103, an internal timer of the CPU 51, which also serves as a clock starts a time count operation. The CPU 51 checks in step S104 that monitors the timer which has started time measurement if a predetermined period of time $t_1$ has elapsed. If the predetermined period of time $t_1$ has not elapsed yet, the flow advances to step S109 (to be described later). If it is determined in step S104 that the predetermined period of time $t_1$ has elapsed, subsequent steps S105 to S108 are repeated. More specifically, the CPU 51 detects an image as a reference image (step S105), determines a change in image, and compares two image detection result to detect a moving object (step S106). That is, if a change in image is detected, the CPU 51 detects a moving image (step S107); otherwise, the CPU 51 detects no moving image (step S108).

The CPU 51 checks the open/close state of the lens barrier 71 in step S109. If the lens barrier 71 is opened, the CPU 51 checks if a predetermined period of time $t_2$ corresponding to the predetermined period of time in step S94 in FIG. 30 has elapsed (step S110). Every time the predetermined period of time $t_2$ has elapsed, the CPU 51 measures an object distance L (step S111), and then executes photometry (step S112) and battery check (step S113).

If any problem (e.g., insufficient battery capacity or the like) is detected as the battery check result in step S113 (S114), the CPU 51 carrier out control to generate a predetermined alert (step S118). Then, the CPU 51 switches the display mode. That is, the CPU 51 disables the electronic viewfinder (EVF) display operation that consumes currents, and enables the optical viewfinder (OVF) display (step S119). After that, the flow advances to step S121.

If it is determined in step S114 that the battery is normal, the CPU 51 executes steps S115 to S117. More specifically, since the EVF cannot make any satisfactory display in a photographing scene with a large change in light shown in, e.g., FIG. 31, the CPU 51 detects a change in amount of light from the amplitudes of the image signals detected in step S102 (step S115). If the change in amount of light is larger than a predetermined value, the flow jumps to step S119 to enable the OVF display mode. On the other hand, if it is determined in step S115 that the change in amount of light is smaller than a predetermined value, the CPU 51 checks if the photographer is about to carry out near-distance photographing in which the distance measuring result (L) is smaller than a predetermined distance ($L_0$) (step S116). If the photographer is about to carry out near-distance photographing (i.e., macro photographing), the CPU 51 enables the EVF display mode free from any parallax (step S120). However, if a moving object is detected in step S107, the flow branches from step S117 to step S119 to enable the OVF display mode. That is, if an object is moving, the OVF display mode is enabled, and the EVF display is made only for a still object.

Subsequently, the CPU 51 if the user has operated the 1st release switch 52a (step S121). If it is determined that the user has not operated the 1st release switch 52a, the flow returns to step S103. On the other hand, if it is determined in step S122 that the user has operated the 1st release switch 52a, the CPU 51 holds the display mode (step S122). The CPU 51 then checks if the user has operated the 2nd release switch 52b (step S123). If it is determined that the user has not operated the 2nd release switch 52b, the CPU 51 checks again if the user has operated the 1st release switch 52a (step S125). If the user has not operated the 1st release switch 52a, the flow returns to step S103.

If it is determined in step S123 that the user has pressed the release button 72 and has consequently operated the 2nd release switch 52b, the CPU 51 executes the photographing sequence (step S124). Upon completion of the photographing sequence, the control returns to the main routine.

The aforementioned display mode switching control continues until the half-stroke depression state of the release button 72 in FIG. 29A is detected by the 1st release switch 52a. Upon detection of the half-stroke depression state, the CPU 51 stops the display mode switching control executed in step S119 or S120. That is, if the camera display mode is switched frequently while the photographer is about to start photographing, the photographer cannot concentrate on composition settling, thus disturbing photographing. Hence, when the photographer has pressed the release button 72 to its half-stroke position, it is determined that the photographer agrees with display at that time, and has pressed the release button 72 to its half-stroke position, and the CPU 51 stops the display mode switching control.

When the camera with the aforementioned display switching function is used, the photographer 100 need only hold the camera toward the object 101 to observe the object in the most appropriate viewfinder display mode at that time. Therefore, the photographer 100 can concentrate on an optimal shutter chance while confirming the facial expression of the object on the viewfinder screen which is free from any display flickering and any unnatural shadow due to a change in brightness.

This camera allows the photographer to take a picture with an appropriate composition via the viewfinder screen which is free from any parallax even in the near distance photographing mode. Furthermore, since this camera is designed to improve the service life of the built-in battery 60 (i.e., switching from the EVF to the OVF) in consideration of current consumption, it can overcome photographing for a long period of time.

When such camera is used in photographing, it can automatically switch to the viewfinder screen of an appropriate display mode in accordance with a photographing situation.

Hence, this camera can obviate the need for conventionally troublesome operations, and allows the photographer to continue comfortable photographing operations without imposing any load in terms of viewfinder system operations on the user.

The following modification of this camera may be made. For example, as items used to determine the photographing condition, various conditions based on the specifications of the camera, the use pattern of the photographer, and the more preferred state of the camera may be used as desired priority of user's choice or priority according to the probability that a preferred photographing result is obtained. Based on such priority, the viewfinder optical path may be controlled to switch.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image sensing apparatus having a distance measuring unit, comprising:
    an image sensing element to form an object image which enters via a photographing optical system;
    a distance measuring unit to measure distances to a plurality of points within a photographing frame using an optical path different from an optical path of photographing optical system;
    a determination unit to determine a relationship between a distance measuring result of the distance measuring unit and a drive amount of the photographing optical system, on the basis of the distance measuring result upon measuring a distance to a first point of the plurality of points by the distance measuring unit and a change in contrast of the object image formed at a position corresponding to the first point on the image sensing element when a focal point position of the photographing optical system has changed; and
    a control unit to control the focal point position of the photographing optical system, on the basis of a distance measuring result of the distance measuring unit at a second point of the plurality of points, which is different from the first point and the relationship determined by the determination unit,
    wherein the distance measuring unit comprises:
    a distance calculation unit to calculate distances to objects present at the plurality of points by detecting image signals of the objects present at the plurality of points; and
    a setting unit to set a highest-contrast point of plurality of points as the first point, and to set a point corresponding to the nearest distance to the object calculated by the distance calculation unit as the second point.

2. The image sensing apparatus according to claim 1, wherein the distance measuring unit comprises a principal object detection unit to detect a location of a principal object from the plurality of points, and
    the determination unit comprises a setting unit to set a point where the principal object is present as the second point.

3. The image sensing apparatus according to claim 2, wherein the principal object detection unit detects a point, at which the distance measuring result indicates a nearest distance, of the plurality of points as the point where the principal object is present.

4. The image sensing apparatus according to claim 1, wherein the distance measuring unit measures distances to objects present at the plurality of points by a passive or active method.

5. The image sensing apparatus according to claim 1, wherein the distance measuring unit comprises a principal object detection unit to detect a principal object on the basis of the distance measuring result, and the determination unit comprises a setting unit to set, as the first point, a point corresponding to a distance near a current focal point position of a photographing lens of the distance measuring results at the plurality of points, and to set a point where the principal object is present as the second point.

* * * * *